US012641320B2

(12) United States Patent
Riedmiller et al.

(10) Patent No.: US 12,641,320 B2
(45) Date of Patent: \*May 26, 2026

(54) MULTISOURCE MEDIA DELIVERY SYSTEMS AND METHODS

(71) Applicant: DOLBY LABORATORIES LICENSING CORPORATION

(72) Inventors: Jeffrey Riedmiller, Novato, CA (US); Mingchao Yu, Sydney (AU); Jason Michael Cloud, Clayton, CA (US)

(73) Assignee: DOLBY LABORATORIES LICENSING CORPORATION

( \* ) Notice: Subject to any disclaimer, the term of this patent is extended or adjusted under 35 U.S.C. 154(b) by 20 days.

This patent is subject to a terminal disclaimer.

(21) Appl. No.: 18/750,847

(22) Filed: Jun. 21, 2024

(65) Prior Publication Data

US 2024/0348891 A1 Oct. 17, 2024

Related U.S. Application Data

(63) Continuation of application No. 18/256,987, filed as application No. PCT/US2021/063723 on Dec. 16, 2021, now Pat. No. 12,081,841.

(Continued)

(51) Int. Cl.
| | |
|---|---|
| *G06F 15/16* | (2006.01) |
| *H04N 21/2183* | (2011.01) |
| *H04N 21/60* | (2011.01) |

(52) U.S. Cl.
CPC ......... *H04N 21/60* (2013.01); *H04N 21/2183* (2013.01)

(58) Field of Classification Search
None
See application file for complete search history.

(56) References Cited

U.S. PATENT DOCUMENTS

| | | | |
|---|---|---|---|
| 9,258,361 | B2 | 2/2016 | Ansari |
| 9,270,299 | B2 | 2/2016 | Luby |

(Continued)

FOREIGN PATENT DOCUMENTS

| | | |
|---|---|---|
| CN | 102427400 B | 10/2014 |
| CN | 105262564 A | 1/2016 |

(Continued)

OTHER PUBLICATIONS

Shuo-Yen Robert Li; Raymond W. Yeung; Ning Cai; "Linear Network Coding," Published in: IEEE Transactions on Information Theory ( vol. 49, Issue: 2, Feb. 2003); pp. 371-381; Date of Publication: Feb. 6, 2003; ISSN Information: Print ISSN: 0018-9448; Electronic ISSN: 1557-9654; INSPEC Accession No. 7544590; DOI: 10.1109/TIT.2002.807285; Publisher: IEEE, pp. 1-11.

(Continued)

*Primary Examiner* — Phuoc H Nguyen

(57) ABSTRACT

A method for delivering media content to one or more clients over a distributed system is disclosed. The method may include generating a plurality of network-coded symbols from a plurality of original symbols representing a first media asset. The method may further include generating an original plurality of coded variants of the first media asset. The method may further include distributing a first coded variant of the original plurality of coded variants to a first cache on a first server device for storage in the first cache. The method may further include distributing a second coded variant of the original plurality of coded variants to a second cache on a second server device for storage in the second cache.

24 Claims, 15 Drawing Sheets

Related U.S. Application Data

(60) Provisional application No. 63/126,265, filed on Dec. 16, 2020.

(56) References Cited

U.S. PATENT DOCUMENTS

| | | | |
|---|---|---|---|
| 9,369,541 B2 | 6/2016 | Medard | |
| 9,680,902 B2 | 6/2017 | Yu | |
| 10,057,742 B2 | 8/2018 | Condeixa | |
| 10,581,554 B2 | 3/2020 | Yu | |
| 11,489,938 B2 * | 11/2022 | Cloud | H04N 21/64784 |
| 11,509,417 B2 | 11/2022 | Yu | |
| 12,081,841 B2 * | 9/2024 | Riedmiller | H04N 21/2183 |
| 2010/0232518 A1 * | 9/2010 | Coleman, Sr. | H04N 21/25816 |
| | | | 375/E7.005 |
| 2013/0332621 A1 | 12/2013 | Keller | |
| 2014/0143439 A1 | 5/2014 | Ramamurthy | |
| 2016/0148618 A1 * | 5/2016 | Huang | G10L 19/0212 |
| | | | 381/2 |
| 2017/0201497 A1 | 7/2017 | Rhyu | |
| 2018/0159915 A1 | 6/2018 | Westphal | |
| 2018/0212713 A1 | 7/2018 | Yu | |
| 2020/0260048 A1 * | 8/2020 | Merg | G06F 3/1423 |
| 2020/0275171 A1 * | 8/2020 | Cloud | H04L 65/75 |
| 2020/0336540 A1 | 10/2020 | Xu | |

FOREIGN PATENT DOCUMENTS

| | | |
|---|---|---|
| CN | 109347983 B | 2/2021 |
| EP | 1826980 B1 | 7/2009 |
| JP | 2004253922 A | 9/2004 |

OTHER PUBLICATIONS

Te Sun Han; "Multicasting Multiple Correlated Sources to Multiple Sinks Over a Noisy Channel Network," Published in: IEEE Transactions on Information Theory ( vol. 57, Issue: 1, Jan. 2011), pp. 4-13, Date of Publication: Dec. 23, 2010, ISSN Information: INSPEC Accession No. 11704614; DOI: 10.1109/TIT.2010. 2090223; Publisher: IEEE, pp. 1-10.

* cited by examiner

400

ORIGIN DISTRIBUTION ⌒ 405

> GENERATE A PLURALITY OF NETWORK-CODED SYMBOLS FROM A PLURALITY OF ORIGINAL SYMBOLS REPRESENTING A FIRST MEDIA ASSET

⌒ 410

> GENERATE AN ORIGINAL PLURALITY OF CODED VARIANTS OF THE FIRST MEDIA ASSET THAT EACH INCLUDE ONE OR MORE SYMBOLS THAT INCLUDE AT LEAST ONE OF (I) ONE OR MORE ORIGINAL SYMBOLS OF THE PLURALITY OF ORGINAL SYMBOLS AND (II) ONE OR MORE NETWORK-CODED SYMBOLS OF THE PLURALITY OF NETWORK-CODED SYMBOLS

⌒ 415

> DISTRIBUTE A FIRST CODED VARIANT OF THE ORIGINAL PLURALITY OF CODED VARIANTS TO A FIRST CACHE ON A FIRST SERVER DEVICE FOR STORAGE IN THE FIRST CACHE

⌒ 420

> DISTRIBUTE A SECOND CODED VARIANT OF THE ORIGINAL PLURALITY OF CODED VARIANTS TO A SECOND CACHE ON A SECOND SERVER DEVICE FOR STORAGE IN THE SECOND CACHE

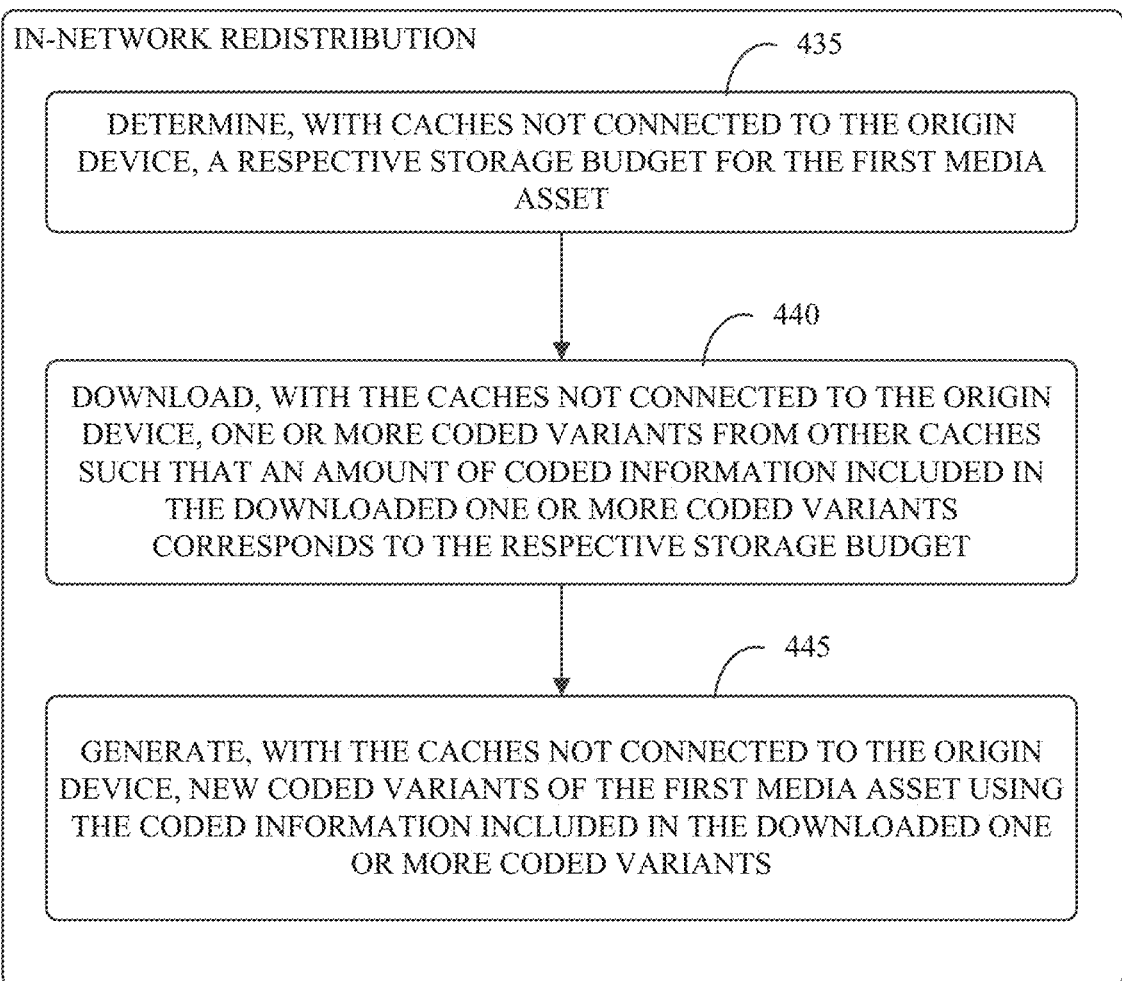

IN-NETWORK REDISTRIBUTION        435

DETERMINE, WITH CACHES NOT CONNECTED TO THE ORIGIN DEVICE, A RESPECTIVE STORAGE BUDGET FOR THE FIRST MEDIA ASSET

440

DOWNLOAD, WITH THE CACHES NOT CONNECTED TO THE ORIGIN DEVICE, ONE OR MORE CODED VARIANTS FROM OTHER CACHES SUCH THAT AN AMOUNT OF CODED INFORMATION INCLUDED IN THE DOWNLOADED ONE OR MORE CODED VARIANTS CORRESPONDS TO THE RESPECTIVE STORAGE BUDGET

445

GENERATE, WITH THE CACHES NOT CONNECTED TO THE ORIGIN DEVICE, NEW CODED VARIANTS OF THE FIRST MEDIA ASSET USING THE CODED INFORMATION INCLUDED IN THE DOWNLOADED ONE OR MORE CODED VARIANTS

MULTI-SOURCE MULTI-PATH DOWNLOAD

TRANSMIT TO A PLURALITY OF CACHES, WITH A CLIENT DEVICE, A REQUEST FOR CONSUMPTION OF THE FIRST MEDIA ASSET, WHEREIN A CODED VARIANT OF THE FIRST ASSET IS STORED IN EACH CACHE OF THE PLURALITY OF CACHES, AND WHEREIN EACH CODED VARIANT IS FUNCTIONALLY-EQUIVALENT SUCH THAT AN AMOUNT OF ANY DATA THAT EXCEEDS A THRESHOLD AMOUNT OF DATA AND THAT IS DRAWN FROM ANY ONE OR MORE CODED VARIANTS ALLOWS FOR DECODING OF THE AMOUNT OF ANY DATA TO RECOVER THE FIRST MEDIA ASSET — 465

DOWNLOAD, WITH THE CLIENT DEVICE, A FIRST CODED VARIANT FROM A FIRST CACHE OF THE PLURALITY OF CACHES VIA A FIRST COMMUNICATION LINK — 470

DOWNLOAD, WITH THE CLIENT DEVICE, A SECOND CODED VARIANT FROM A SECOND CACHE OF THE PLURALITY OF CACHES VIA A SECOND COMMUNICATON LINK DIFFERENT FROM THE FIRST COMMUNICATION LINK, WHEREIN THE SECOND CODED VARIANT IS RECEIVED CONCURRENTLY WITH THE FIRST CODED VARIANT — 475

DECODE, WITH THE CLIENT DEVICE, AT LEAST SOME OF ONE OR MORE SYMBOLS INCLUDED IN AT LEAST ONE OF THE FIRST CODED VARIANT AND THE SECOND CODED VARIANT TO RECOVER THE FIRST MEDIA ASSET — 480

OUTPUT, WITH THE CLIENT DEVICE, THE FIRST MEDIA ASSET ON AN OUTPUT DEVICE OF THE CLIENT DEVICE — 485

FIG. 4C

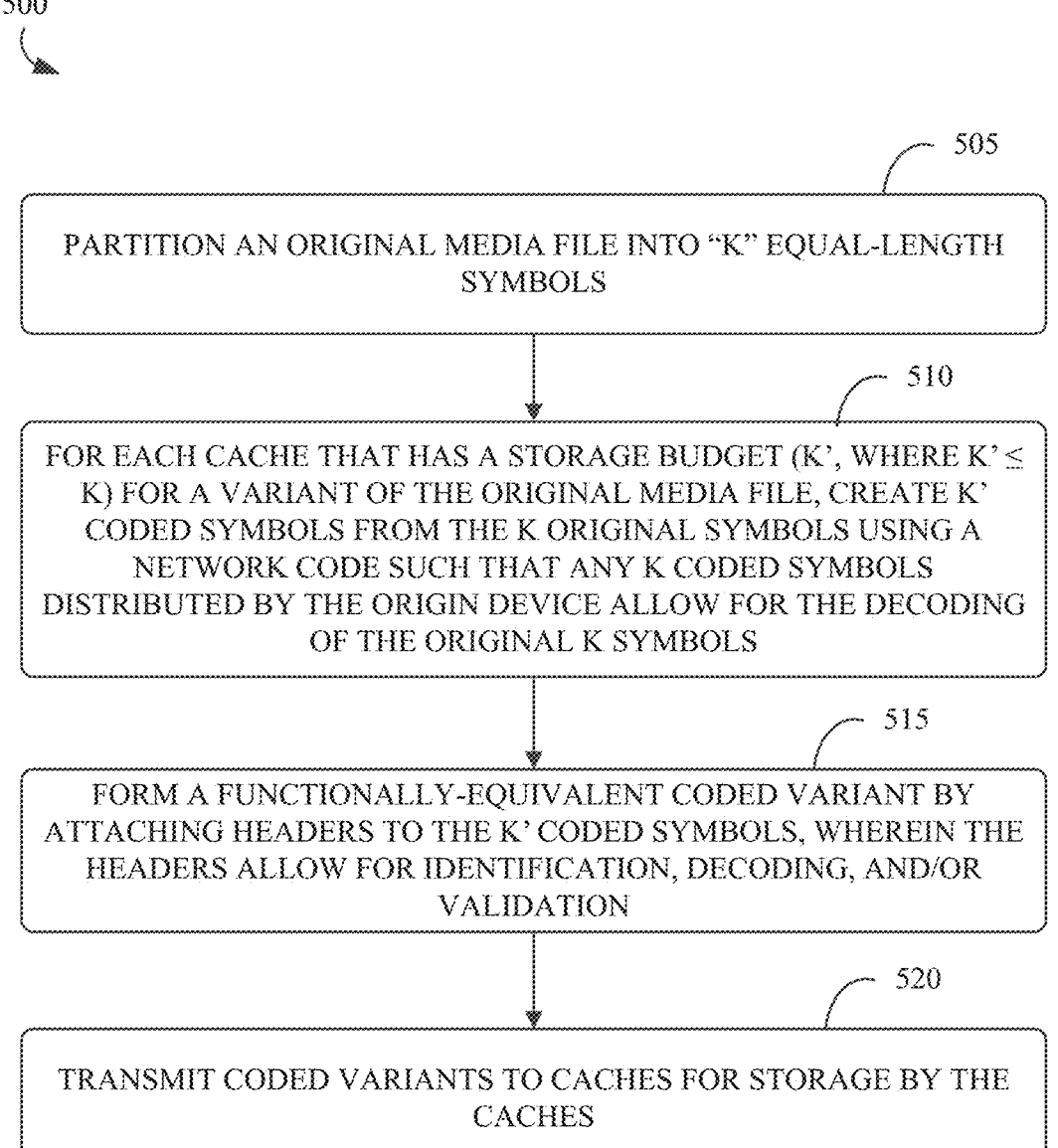

500

505

PARTITION AN ORIGINAL MEDIA FILE INTO "K" EQUAL-LENGTH SYMBOLS

510

FOR EACH CACHE THAT HAS A STORAGE BUDGET (K', WHERE K' ≤ K) FOR A VARIANT OF THE ORIGINAL MEDIA FILE, CREATE K' CODED SYMBOLS FROM THE K ORIGINAL SYMBOLS USING A NETWORK CODE SUCH THAT ANY K CODED SYMBOLS DISTRIBUTED BY THE ORIGIN DEVICE ALLOW FOR THE DECODING OF THE ORIGINAL K SYMBOLS

515

FORM A FUNCTIONALLY-EQUIVALENT CODED VARIANT BY ATTACHING HEADERS TO THE K' CODED SYMBOLS, WHEREIN THE HEADERS ALLOW FOR IDENTIFICATION, DECODING, AND/OR VALIDATION

520

TRANSMIT CODED VARIANTS TO CACHES FOR STORAGE BY THE CACHES

FIG. 5

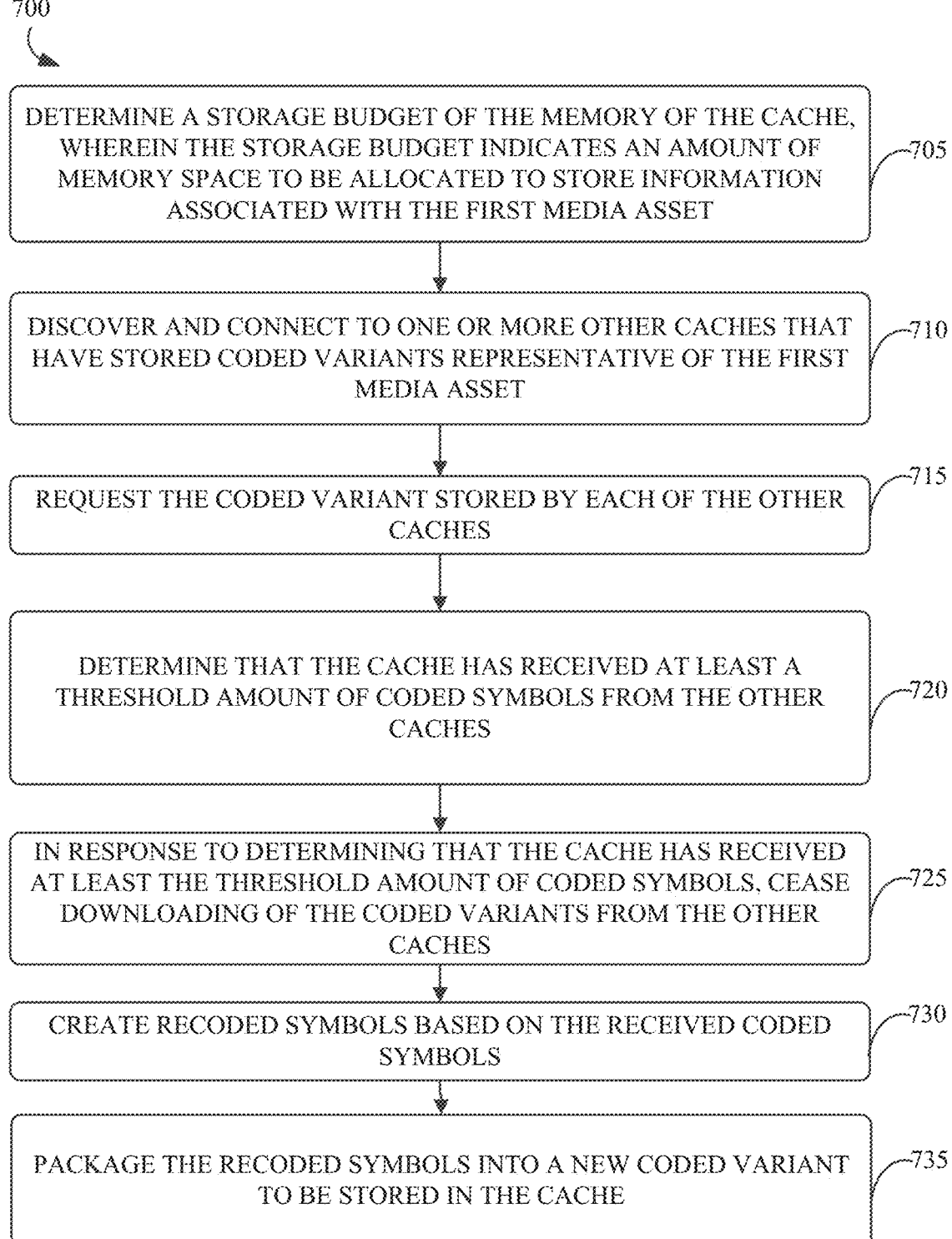

700

DETERMINE A STORAGE BUDGET OF THE MEMORY OF THE CACHE, WHEREIN THE STORAGE BUDGET INDICATES AN AMOUNT OF MEMORY SPACE TO BE ALLOCATED TO STORE INFORMATION ASSOCIATED WITH THE FIRST MEDIA ASSET — 705

DISCOVER AND CONNECT TO ONE OR MORE OTHER CACHES THAT HAVE STORED CODED VARIANTS REPRESENTATIVE OF THE FIRST MEDIA ASSET — 710

REQUEST THE CODED VARIANT STORED BY EACH OF THE OTHER CACHES — 715

DETERMINE THAT THE CACHE HAS RECEIVED AT LEAST A THRESHOLD AMOUNT OF CODED SYMBOLS FROM THE OTHER CACHES — 720

IN RESPONSE TO DETERMINING THAT THE CACHE HAS RECEIVED AT LEAST THE THRESHOLD AMOUNT OF CODED SYMBOLS, CEASE DOWNLOADING OF THE CODED VARIANTS FROM THE OTHER CACHES — 725

CREATE RECODED SYMBOLS BASED ON THE RECEIVED CODED SYMBOLS — 730

PACKAGE THE RECODED SYMBOLS INTO A NEW CODED VARIANT TO BE STORED IN THE CACHE — 735

FIG. 7

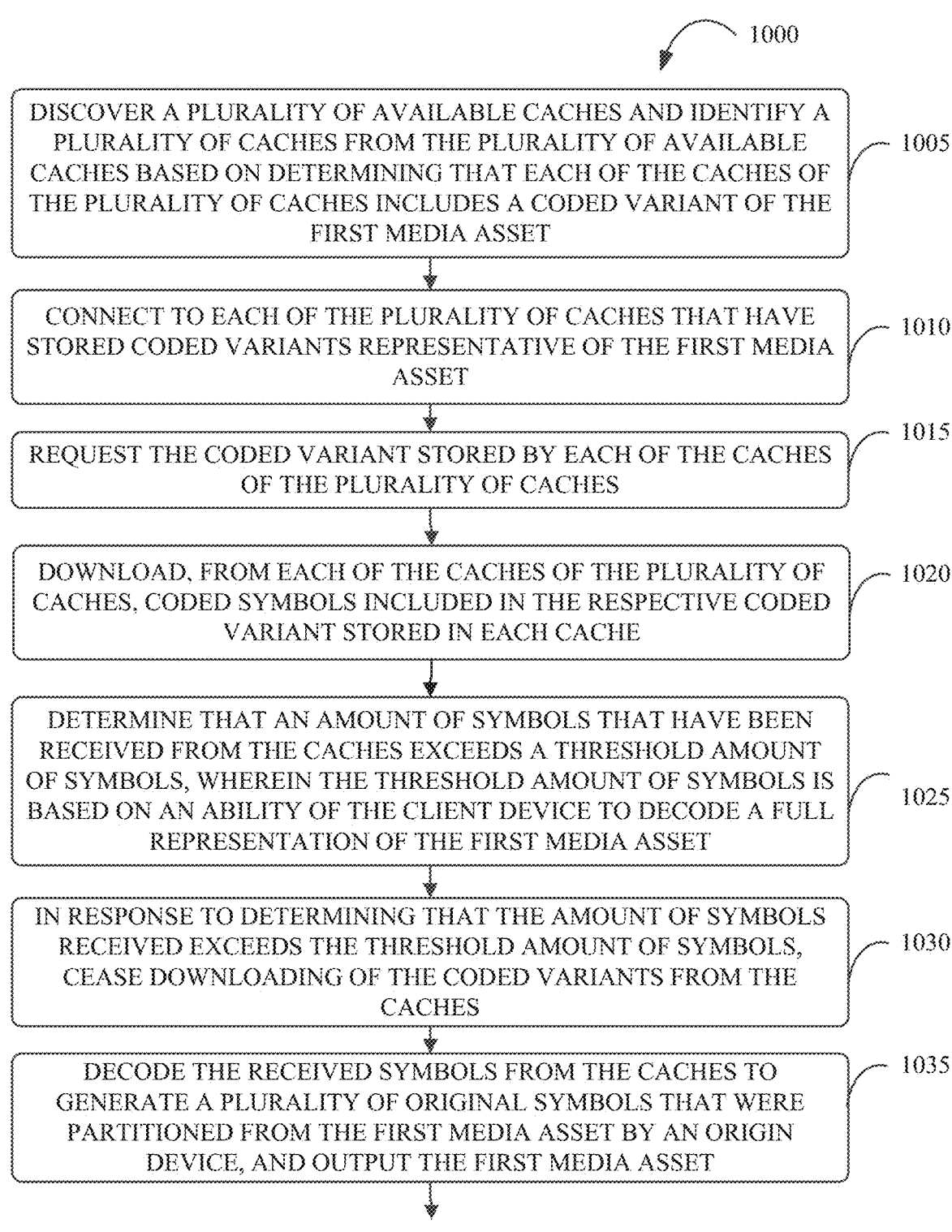

1000

DISCOVER A PLURALITY OF AVAILABLE CACHES AND IDENTIFY A PLURALITY OF CACHES FROM THE PLURALITY OF AVAILABLE CACHES BASED ON DETERMINING THAT EACH OF THE CACHES OF THE PLURALITY OF CACHES INCLUDES A CODED VARIANT OF THE FIRST MEDIA ASSET — 1005

CONNECT TO EACH OF THE PLURALITY OF CACHES THAT HAVE STORED CODED VARIANTS REPRESENTATIVE OF THE FIRST MEDIA ASSET — 1010

REQUEST THE CODED VARIANT STORED BY EACH OF THE CACHES OF THE PLURALITY OF CACHES — 1015

DOWNLOAD, FROM EACH OF THE CACHES OF THE PLURALITY OF CACHES, CODED SYMBOLS INCLUDED IN THE RESPECTIVE CODED VARIANT STORED IN EACH CACHE — 1020

DETERMINE THAT AN AMOUNT OF SYMBOLS THAT HAVE BEEN RECEIVED FROM THE CACHES EXCEEDS A THRESHOLD AMOUNT OF SYMBOLS, WHEREIN THE THRESHOLD AMOUNT OF SYMBOLS IS BASED ON AN ABILITY OF THE CLIENT DEVICE TO DECODE A FULL REPRESENTATION OF THE FIRST MEDIA ASSET — 1025

IN RESPONSE TO DETERMINING THAT THE AMOUNT OF SYMBOLS RECEIVED EXCEEDS THE THRESHOLD AMOUNT OF SYMBOLS, CEASE DOWNLOADING OF THE CODED VARIANTS FROM THE CACHES — 1030

DECODE THE RECEIVED SYMBOLS FROM THE CACHES TO GENERATE A PLURALITY OF ORIGINAL SYMBOLS THAT WERE PARTITIONED FROM THE FIRST MEDIA ASSET BY AN ORIGIN DEVICE, AND OUTPUT THE FIRST MEDIA ASSET — 1035

TO BLOCK 1040 OF FIG. 10B

FIG. 10A

MULTISOURCE MEDIA DELIVERY SYSTEMS AND METHODS

CROSS REFERENCE TO RELATED APPLICATIONS

This application is a Continuation of U.S. application Ser. No. 18/256,987, filed on Jun. 12, 2023, which in turn, claims priority to U.S. National Stage application under U.S.C. 371 of International Application No. PCT/US2021/063723, filed on Dec. 16, 2021 (reference: D20136WO01), which claims priority to U.S. Provisional Application No. 63/126,265, filed Dec. 16, 2020, which are incorporated herein by reference in their entirety.

FIELD OF THE INVENTION

This application relates generally to delivery of visual and/or auditory media over a network to one or more user devices for output of the media by the user devices for consumption by one or more users.

SUMMARY

Various aspects of the present disclosure relate to devices, systems, and methods to provide delivery of media content to a user device from multiple network sources that each store part or all of the media content to be delivered. In some embodiments, the disclosed systems and methods utilize a rearchitected coded media representation (format) in a manner that can effectively achieve a desired goal of efficient operation when operating with multiple (and simultaneous) information sources to improve network quality of service (QOS) and rendered media quality of experience (QoE).

Such a solution may be implemented without having direct control over the network (e.g., without requiring explicit control of routing and/or related orchestration functionalities within the network). For example, the systems and methods disclosed herein enable the media delivery system (server and client) to be free from having to keep track of which specific information is requested and downloaded from each information source. Rather, the systems and methods disclosed herein use an approach that principally keeps track of the amount of information downloaded by a media client regardless of the specific information that has been received from each information source.

The use of the disclosed system(s) and method(s) fundamentally enable each coded media representation generated by an encoder (e.g., a network encoder that generates coded representations based on original source media data) or re-encoder (e.g., a network encoder that generates additional coded media representations based on previously coded media representations) to be useful to a media client (i.e., a user device). The disclosed systems and methods include a combination of network coding and source coding that generates and processes a highly flexible and network-centric multisource media representation (i.e., format) that is uniquely capable of providing many features that are advantageous over current media delivery systems and methods as described in greater detail below.

In one embodiment of the present disclosure, there is provided a method for delivering media content to one or more clients over a distributed system. The method may be performed by a first device. The method may include generating a plurality of network-coded symbols from a plurality of original symbols representing a first media asset. The method may further include generating an original plurality of coded variants of the first media asset. Each coded variant may include one or more symbols that may include at least one of (i) one or more original symbols of the plurality of original symbols and (ii) one or more network-coded symbols of the plurality of network-coded symbols. The method may further include distributing a first coded variant of the original plurality of coded variants to a first cache on a first server device for storage in the first cache. The method may further include distributing a second coded variant of the original plurality of coded variants to a second cache on a second server device for storage in the second cache.

In another embodiment of the present disclosure, there is provided a method for receiving media content over a distributed system. The method may include transmitting to a plurality of caches, with a client device, a request for consumption of a first media asset. A coded variant of the first media asset may be stored in each cache of the plurality of caches. Each coded variant may include one or more symbols that may each represent an original symbol of the first media asset. Each coded variant may be functionally-equivalent such that an amount of any data that exceeds a threshold amount of data and that is drawn from any one or more coded variants allows for decoding of the amount of any data to recover the first media asset. The method may further include downloading, with the client device, a first coded variant from a first cache of the plurality of caches via a first communication link. The method may further include downloading, with the client device, a second coded variant from a second cache of the plurality of caches via a second communication link different from the first communication link. The second coded variant may be received concurrently with the first coded variant. The method may further include decoding, with the client device, at least some of the one or more symbols included in at least one of the first coded variant and the second coded variant to recover the first media asset. The method may further include outputting, with the client device, the first media asset on an output device.

In another embodiment, there is provided a non-transitory computer-readable storage medium storing one or more programs configured to be executed by one or more electronic processors of an electronic device that may include a network interface and an output device. The one or more programs may include instructions for performing either of the methods described above.

In another embodiment, there is provided an electronic device that may include a network interface, an output device, one or more electronic processors, and a memory storing one or more programs configured to be executed by the one or more electronic processors. The one or more programs may include instructions for performing either of the methods described above.

Other aspects of the embodiments will become apparent by consideration of the detailed description and accompanying drawings.

BRIEF DESCRIPTION OF THE DRAWINGS

FIGS. 4A-4C illustrate flowcharts of three main phases of overall data processing and transmission for delivering media content from an origin device of the system of FIG. 1 to the client device of the system of FIG. 1 according to one example embodiment. FIG. 4A illustrates an origin distribution method performed by the origin device according to one example embodiment. FIG. 4B illustrates an in-network redistribution method performed by a cache of the system of FIG. 1 according to one example embodiment. FIG. 4C illustrates a multi-source multi-path download method performed by the client device according to one example embodiment.

FIG. 5 illustrates a flowchart of a method for encoding and distributing media content from the origin device of the system of FIG. 1 according to one example embodiment.

FIG. 7 illustrates a flowchart of a method for creating a functionally-equivalent coded variant at a new cache of the system of FIG. 1 without connecting to the origin device of the system of FIG. 1 according to one example embodiment.

FIGS. 10A and 10B illustrate a flowchart of a method for downloading media content in a multi-source, multi-path manner on a client device of the system of FIG. 1 according to one example embodiment.

DETAILED DESCRIPTION

Figure 1:
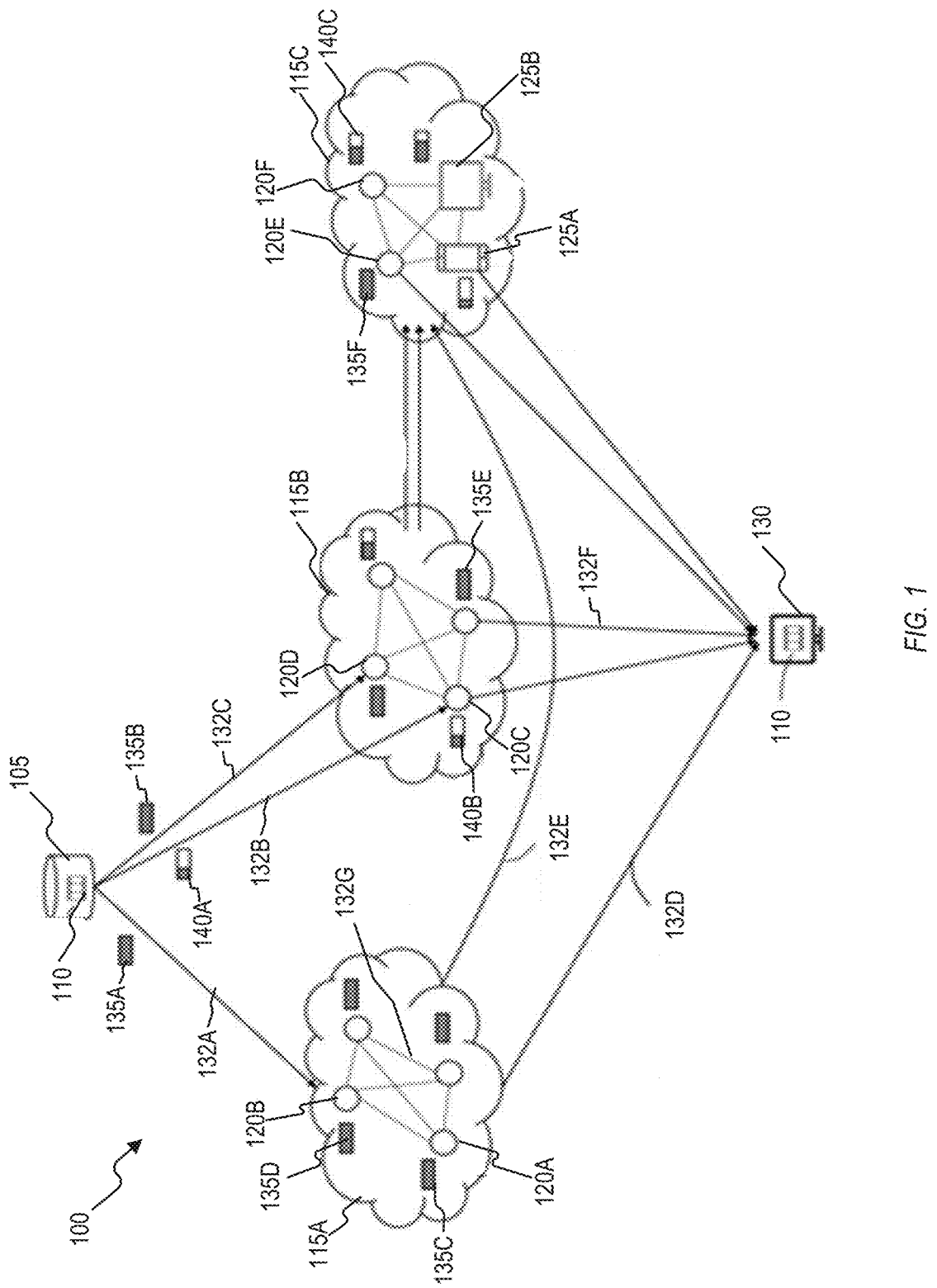
FIG. 1 illustrates an example media delivery system according to embodiments described herein.

Currently, source coding media for delivery over the internet may be built upon a legacy of using a single numeric representation for each coded media bitrate/resolution across storage paradigms (e.g., each bitrate/resolution is represented by a specific sequence of bits or which encode the underlying source media), distribution paradigms, and delivery paradigms. The current Over-the-Top (OTT) delivery paradigm makes use of a server-client single-path (unicast) streaming model by using traditional source-coding methods and segment-based media formatting. In such current models, uncompressed media is first source coded into multiple bitrates and resolutions, using a combination of entropy, parametric and perceptually motivated techniques. These source coded media are then temporally segmented for storage and delivery to one or more user devices. This existing method enables viewer/client software on a user device to selectively download appropriate bitrates/resolutions during the streaming session in an attempt to support a high-quality and seamless viewer experience while operating across a non-deterministic range of network conditions.

Most often the above-explained current approach is coupled with the use of Content Delivery Networks (CDNs)

that make use of multiple Points-of-Presence (PoPs) to replicate placement/storage of the source coded media (e.g., multiple numeric representations for each supported media bitrate/resolution) closer to viewers (i.e., user devices) in a further effort to improve end user Quality of Service (QOS) and Quality of Experience (QoE). Inevitably, this situation means that a high degree of media replication exists across CDN PoPs using the current approach. For example, many different caches may store full versions of source coded media in case a user device requests the specific source coded from one of the caches.

In current OTT media service operations, media player client software on a user device may generate requests to a single CDN for source coded segments and the CDN may redirect these requests to a single POP (i.e., 'source') in its network. The CDN may then respond to the client (i.e., user device) by delivering (e.g., serving) the requested media segment to the requesting client (i.e., user device). This media client request and CDN server response process continues for the duration of a unicast streaming session until completion of streaming session or until a decision is made (e.g. based on network conditions, CDN performance metrics including an outage, etc.) for the client to switch its requests to a different CDN. For example, the CDN and/or the user device may switch the requests from the user device to a different CDN that is more performant at the current time in order to, for example, recover from eroded end user experience(s) such as a CDN outage or suboptimal through-put from the CDN.

Currently, CDN switching solutions are not instantaneous nor seamless. Depending on the switching approach in use, switching may result in minutes long delays prior to a switch taking place. This provides disadvantages such as maintained use of the underperforming CDN during the time it takes to switch to a different CDN. Accordingly, it would be beneficial to shorten switching time resulting from path/CDN outages or other types of degraded performance, etc.

One of the characteristics of existing media content delivery systems and methods that contributes to the problems/disadvantages described above is that the requested media traffic leaving a CDN is being delivered over a single communication pathway and is drawn from a single numeric representation of the source coded media or information source. In the above example, the information source is the single CDN serving the request. If an OTT media service is using multiple CDNs, the original source coded media representation (i.e. the specific/unique numeric representation and arrangement of the source coded data itself) may be replicated across each CDN as explained previously herein. Thus, identical copies of the numeric representation generated when the media was originally source coded may be replicated across all the CDNs (and their respective PoPs) in use.

In this setup, if clients are directed to switch to a different CDN (e.g., in response to a CDN failure), the client is therefore requesting the same info (e.g., the replicated numeric representation of the source coded media) as it did with the previous CDN. Moreover, after the switch, the media client is still effectively requesting media from a single information source (i.e., a different, single CDN).

It is known that traffic to/from different CDN vendors may take different paths through the core (public and private) network/cloud and internet service provider to/from the requesting media client. For example, differences in network topography, infrastructure resource utilization, and routing algorithms associated with each respective CDN ISP, Cloud provider or IXP combined with real-world variability in network traffic patterns and conditions may cause traffic to be routed along non-identical paths.

However, another disadvantage of the current use of highly replicated source coded media (again, using a single numeric representation) within and across CDNs is that it is not capable of easily and efficiently leveraging this inherent path diversity to result in a performance advantage. Therefore, in current OTT media delivery systems, if a media client requests a specific asset or source coded media segment from multiple CDNs simultaneously (in an attempt to perhaps improve service resiliency, reliability and QoE enhancing throughput as an example), the responses from all of the CDNs—delivered over a plurality of network paths—will contain a significant amount of redundant information. For example, each CDN delivers responses containing identical copies of the single numeric representation generated when the media was originally source coded.

This result is due to the original source coding (which generated a single numeric representation) of the media that was then replicated within and across the CDNs. This approach is disadvantageous because it is wasteful of network resources (e.g., link utilization, link time, time slots on transmission media, link bandwidth, network computer resources, network storage resources, etc.). Collectively, such waste incurs substantial cost overhead since the OTT service is paying for the delivery of redundant information that is not useful by the client. Similarly, another disadvantage of current systems is that downstream resources (e.g., client compute, storage, and network resources) are also wasted as excess redundant information must be received and processed (e.g., discarded). For mobile client devices that typically have limited resources, reducing consumption of resources reduces power consumption, and, in the case of battery-operated devices, improves battery life.

One type of client implementation may also attempt to employ complex scheduling algorithms to minimize downloading redundant information from each of the CDN information sources. However, due to the non-deterministic nature of the network between the server and client, efficient real-time scheduling and sizing of requested segment downloads across each path on a continuous basis is highly prone to error. These errors can result in a reduction of rendered QoE including increased buffering, etc.

Accordingly, an easy-to-implement solution that effectively addresses the efficiency and performance challenges of existing media delivery systems explained above while operating with multiple information sources (including multiple CDNs or other types of network storage and caching paradigms) has not yet been created. However, such a solution is desirable for at least the above-noted reasons and would provide technological improvements to address the technological problems described above with respect to existing media delivery systems and methods.

One way to provide such a solution is to rearchitect the coded media representation (format) itself in a manner that can effectively achieve the desired goal of efficient operation when operating with multiple (and simultaneous) information sources to improve network QoS and rendered media QoE. Such a solution may be implemented without having direct control over the network (e.g., without requiring explicit control of routing and/or related orchestration functionalities within the network).

Some embodiments disclosed herein include one or more methods that employ the use of a coded multisource media representation that can efficiently leverage the time-varying information carrying capacity through the inherent multipath architecture of highly interconnected networks (e.g.

the internet, CDN, or ISP networks) without the burden of employing complex scheduling or control over network routing and with very little or no redundant information flowing. In other words, the systems and methods disclosed herein enable the media delivery system (server and client) to be free from having to keep track of which specific information is requested and downloaded from each information source. Rather, the systems and methods disclosed herein use an approach that principally keeps track of the amount of information downloaded by a media client regardless of the specific information that has been received from each information source.

The use of the disclosed system(s) and method(s) fundamentally enable each coded media representation generated by an encoder (e.g., a network encoder that generates coded representations based on original source media data) or re-encoder (e.g., a network encoder that generates additional coded media representations based on previously coded media representations) to be useful to a media client (i.e., a user device).

When operating over multiple pathways (simultaneously) where a media client is drawing from multiple information sources, the disclosed systems and methods also support zero switching time to the most performant network pathways, information sources (CDNs, caches, etc.) and are highly resilient to outages, momentary path performance degradations, etc. These features address the technological problems described above with respect to current media delivery systems and result in improved media delivery systems and methods. Overall, the disclosed systems and methods ultimately lead to achieving increased levels of network QoS and end user QoE performance that are not achievable for the single numeric representation-based media source coding methods that currently exist.

Additionally, operation over multiple pathways and using multiple information sources enables new opportunities for more efficiently managing content cached across multiple PoPs by providing the capability to transparently cache only a subset of the information (rather than all of the information) at each POP. This information can then be redistributed as needed to other PoPs. These opportunities to more efficiently manage cached content may significantly reduce the amount of information cached and may reduce the communications needed to deploy this information within and across all of the information sources in a dynamic manner. Accordingly, these opportunities to more efficiently manage cached content provide additional technological improvements over current media delivery systems and methods.

The disclosed systems and methods include a combination of network coding and source coding that generates and processes a highly flexible and network-centric multisource media representation (i.e., format) that is uniquely capable of providing many features that are advantageous over current media delivery systems and methods.

For example, the disclosed systems and methods provide efficient operation when simultaneously operating over multiple (and dynamic) information sources such as CDNs, CDN PoPs, and other types of network/cloud storage (e.g., open caching in ISPs). As another example, the disclosed systems and methods improve network reliability and efficiency for delivered media, and improved QoS and QoE for network delivered media. In some embodiments, QoS may indicate throughput, throughput jitter, resilience to outages, etc. In some embodiments, QoE may indicate improvement in playback bitrate/resolution, rebuffering percentage, quality shifts during playback, time to first byte (TTFB), etc.

The disclosed systems and methods may also enable new and more efficient storage, distribution, and delivery paradigms via multipath, simplified operation over heterogenous access technologies, peer-assisted systems, decentralized systems including emerging ICN architectures-without requiring feedback, data-driven network performance analytics and/or complex state and path management.

The disclosed systems and methods may also enable in-network generation of new and functionally equivalent multi-source media representations from existing ones without having to return to the original media source (stored at an origin device). This in-network generation of such multi-source media representations may reduce cost and improve performance of the network. In some embodiments, the disclosed systems and methods may operate with any underlying source codec. The disclosed systems and methods may provide seamless (and, in some situations, instantaneous) CDN path switching and offloading.

Among the above-noted benefits, the ground-up network-centric multi-source media representation utilized by the systems and methods disclosed herein provides the industry with new/additional flexibility to operate efficiently and more reliably over the inherently distributed, decentralized, interconnected (multipath) and dynamic (non-deterministic) nature of a global network and cloud landscape utilized in communication systems.

FIG. 1 illustrates an example of a media delivery system 100. The system 100 may be a decentralized coded multi-source, multi-path media delivery system 100. In some embodiments, the system 100 includes an origin server 105 (i.e., an origin device 105) that includes media content such as a source-coded original media file 110 (i.e., a media asset). As shown in FIG. 1, the system 100 also may include one or more clusters 115A-C of caches 120 (i.e., cache clusters/server devices 115A, 115B, 115C). Each cache cluster 115 may include a plurality of connected caches 120 that can store and serve data files. Some examples of a cluster 115 include a content delivery network (CDN), a set of edge computing nodes, a set of Internet service provider (ISP) nodes with caching capability, a set of peer user devices 125A and 125B), or a hybrid cluster including two or more different types of caches 120 (e.g., including at least a first cache type and a second cache type different from the first cache type).

In some embodiments, a cache 120 or a cluster 115 including one or more caches 120 may include a connected client device (e.g., a television, a set top box, a mobile device such as a tablet or smart phone, etc.), a gateway device (cable modem, home network appliance, etc.), or any device that can store and serve media content. In some embodiments, the peer devices 125 are user devices 130 that are providing caching functionality as described in greater detail below. In other words, a user device 130 performing caching functionality that is typically performed by the caches 120 may be referred to as a peer device 125.

In some embodiments, the system 100 includes an end user device 130 (i.e., an end user client device, a client device, or a user device) that requests consumption of the original media file 110. For example, the user device 130 may be configured to locally store, play, or process a representation of the original media file 110 at an originally encoded bitrate/quality or at a non-original bitrate/quality. The system 100 may include one or more user devices 130. In some embodiments, user devices 130 may include mobile/smart phones, tablets, computers, automotive infotainment systems, gaming systems, set-top-boxes, smart televisions, smart speakers, audio/video receivers, media streaming devices, soundbars, wearable devices such as augmented reality/virtual reality headsets, or other devices a user may use to consume media content. In some embodiments, the user device 130 may also serve as a connected cache, for example, by performing caching functionality that is the same as or similar to the functionality performed by the caches 120 as described herein.

As shown in FIG. 1, the system 100 may include communication links 132 between components of the system 100 over which components of the system 100 may communicate with each other. In some embodiments, the communication links 132 are bidirectional communication links. While not every communication link is explicitly labeled in FIG. 1, any lines/arrows between components of the system 100 are indicative of communication links. In some embodiments, the communication links 132 and the components of the system 100 between the origin device 105 and the user device 130 may be referred to as a network.

In some embodiments, any element of the system 100 that requests and/or receives media content may be referred to as a client (e.g., requesters/receivers at interim nodes/caches 120 and requesters/receivers that decode and render media content). Clients may include caches 120, peer devices 125, and client devices 130. For example, a cache 120 may be a client when it requests and stores media content for future access by other caches 120, peer devices 125, and client devices 130 even though the cache 120 may not render/output the media content for playback to a user. As another example, a client device 130 may be a client when it requests media content for rendering/outputting for playback to a user. However, each of these devices/elements of the system 100 (e.g., caches 120, peer devices 125, and client devices 130) may, at times, provide previously stored media content to other devices/elements of the system 100. At such times, the devices/elements providing the previously stored media content may not be considered to be operating as a client.

As explained previously herein, in existing media delivery systems, the origin server distributes the original media file 110 to all caches that are communicatively coupled to the origin server for duplication of the original media file 110. In contrast, in some embodiments of the disclosed system 100, the origin server 105 uses network coding to create a set of uniquely coded representations (i.e., variants) of the original media file 110 and distributes the variants to one or more connected caches 120 (see FIG. 5 and corresponding explanation below). These coded variants each include a unique representation of the original media file 110, for example, as described in U.S. application Ser. No. 15/405, 874, filed Jan. 13, 2017, now U.S. Pat. No. 10,581,554; U.S. application Ser. No. 16/750,185, filed Jan. 23, 2020; and U.S. application Ser. No. 16/634,568, filed Jan. 27, 2020, the entire contents of each of which are hereby incorporated by reference. Additionally, variants may differ in size. For example, a full-size variant 135 (which independently allows for the recovery of the original media file 110 through network decoding) is larger than a partial variant 140 (which does not independently allow for the recovery of the original media file 110 through network decoding since it does not have enough information). Even though variants 135, 140 can be the same size or different sizes than each other, the variants 135, 140 are functionally equivalent (FE) in the sense that any sufficient amount of data (e.g., any amount of data that exceeds a threshold amount of data) drawn from any set of variants 135, 140 allows for the decoding of the original media file 110. In some embodiments, assuming K is the number of original symbols into which the original media file 110 is partitioned (e.g., by the origin server 105 or a device upstream of the origin server 105), two variants 135, 140 are functionally equivalent if any set of symbols (up to K symbols) from the two variants 135, 140 form an innovative set (i.e., K linearly independent symbols). In other words, downloading any K symbols from the two variants 135, 140 allows for the recovery of the original media file 110 by a device that downloaded the any K symbols, for example, as described in U.S. application Ser. No. 15/405,874, filed Jan. 13, 2017, now U.S. Pat. No. 10,581,554 and U.S. application Ser. No. 16/750,185, filed Jan. 23, 2020, the entire contents of each of which are hereby incorporated by reference.

In existing media delivery systems, caches not connected to the origin server connect to one of its neighbors to create a duplication of the original media file 110. In contrast, in the disclosed system 100, the caches 120 connect to multiple neighboring caches 120 and efficiently use the FE variants 135, 140 of the neighboring caches 120 to create their own (e.g., new or distinct) FE variant 135, 140 of the original media file 110. In some embodiments, with appropriate network code, the generation of an FE variant 135, 140 by a cache 120 can be achieved without decoding the original media file 110. The newly-created FE variant can also be a full variant 135 or a partial variant 140. Additionally and as mentioned previously herein, user devices 130 may also function as caches 120, for example, by contributing cached data as peer user devices 125.

The above-described code-driven distribution mechanism yields a decentralized media delivery system where each cache 120 stores different, yet functionally equivalent, variants 135, 140 of the same original media file 110. This system enables an efficient, decentralized, multi-source, multi-path download by, for example, the user device 130. For example, the user device 130 can download a media asset from multiple caches 120, in parallel and possibly via different communication links 132 (e.g., communication links 132D and 132F among other communication links). The user device 130 may then terminate all in-process downloads upon receiving an aggregated amount of information equivalent to the size of the original media file 110 (or equivalent to the size of the original media file 110 plus some additional amount of information). Through network decoding, the user device 130 may then recover the original media file 110 and output the original media file 110 for consumption by a user. Accordingly, the user device 130 can benefit from the aggregated bandwidth and stability of all the communication links 132 without increasing download cost (e.g., without downloading extraneous/duplicative information from multiple caches 120).

In some embodiments, the system 100 includes additional or fewer components in configurations different from that illustrated in FIG. 1. In FIG. 1, some components (e.g., caches 120, communication links 132, full variants 135, and partial variants 140) are labeled using an alphabetical suffix to distinguish such components from other like-named components. Additionally, FIG. 1 illustrates multiple instances of many similar components (e.g., caches 120, communication links 132, full variants 135, and partial variants 140). However, not all instances of each component are labeled with a separate reference number in FIG. 1. Nevertheless, unlabeled instances of components function similarly to like-named components that are labeled.

As explained previously herein, the media delivery technique of the system 100 explained herein is an improvement to existing single-source, single-path delivery techniques where the user device only connects to one cache at a time to download the original media file 110. The performance of this existing technique is limited by the single link between the cache and the user device, which is vulnerable to cache or link degradations and failures. Additionally, the media delivery technique of the system 100 explained herein is an improvement to existing single-source, single-path delivery techniques because it does not require time-consuming and error-prone scheduling between downloads by the user device in order to avoid downloading duplicated data from each cache (e.g., CDN).

Figure 2:
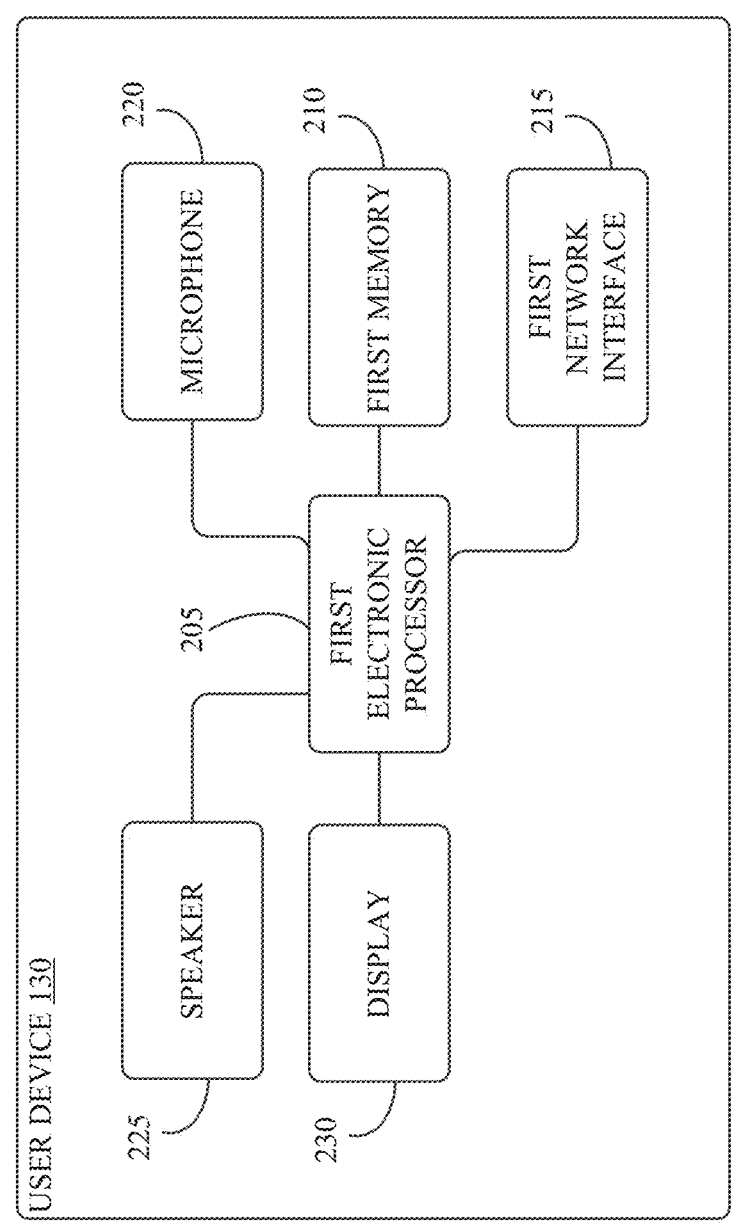
FIG. 2 illustrates a block diagram of a user device of the media delivery system of FIG. 1 according to one example embodiment.

FIG. 2 is a block diagram of the user device 130 (i.e., client device 130) according to one example embodiment. As mentioned above, the user device 130 may include many different types of user devices 130 such as a television, a tablet, a smart phone, a computer, and the like. In the embodiment illustrated, the user device 130 includes a first electronic processor 205 (for example, a microprocessor or other electronic device). The first electronic processor 205 includes input and output interfaces (not shown) and is electrically coupled to a first memory 210, a first network interface 215, an optional microphone 220, a speaker 225, and a display 230. In some embodiments, the user device 130 includes fewer or additional components in configurations different from that illustrated in FIG. 2. For example, the user device 130 may not include the microphone 220. As another example, the user device 130 may include one or more additional input devices such as a computer mouse and/or a keyboard that receive inputs from a user of the user device 130. As yet another example, the user device 130 may include a location tracking device (e.g., a global positioning system (GPS) receiver). In some embodiments, the user device 130 performs functionality other than the functionality described below.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 may send and/or receive data to and/or from other components of the system 100 (e.g., caches 120, peer devices 125 that may also be user devices 130, the origin device 105, etc.) over one or more of the communication links 132. In some embodiments, the first network interface 215 includes one or more transceivers for wirelessly communicating with the other components of the system 100. Alternatively or in addition, the first network interface 215 may include a connector or port (such as an Ethernet cable) for receiving a wired connection to one or more of the other components of the system 100. The first electronic processor 205 may receive one or more media assets (for example, a video, audio data, another data stream or file, and the like) over one or more of the communication links 132 through the first network interface 215. The first electronic processor 205 may output the one or more media assets received through the first network interface 215 through the speaker 225, the display 230, or a combination thereof (i.e., for consumption by a user). Additionally, the first electronic processor 205 may communicate data generated by the user device 130 to other components of the system 100 over one or more of the communication links 132 through the first network interface 215. For example, the first electronic processor 205 may request a media asset from one or more of the caches 120. The caches 120 that have a stored variant of the requested media asset may then transmit their stored variant to the user device 130 in response to receiving the request from the user device 130.

The display 230 is configured to display images, video, text, and/or data to a user of the user device 130. The display 230 may be a liquid crystal display (LCD) screen or an organic light emitting display (OLED) display screen. In some embodiments, a touch sensitive input interface may be incorporated into the display 230 as well, allowing the user to interact with content provided on the display 230. In some embodiments, the display 230 includes a projector or future-developed display technologies. In some embodiments, the speaker 225 and the display 230 are referred to as output devices that present media and other information to a user of the user device 130. In some embodiments, the microphone 220, a computer mouse, and/or a keyboard or a touch-sensitive display are referred to as input devices that receive input from a user of the user device 130.

Figure 3:
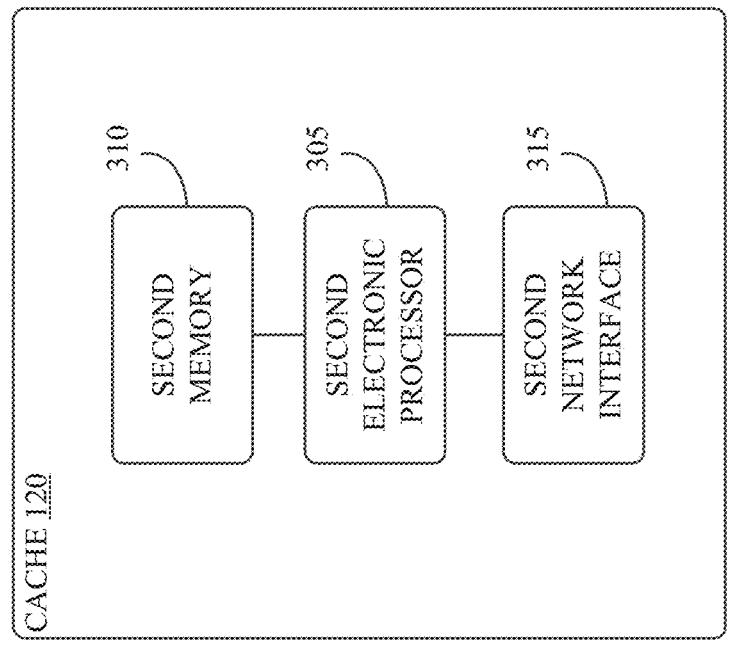
FIG. 3 illustrates a block diagram of one of the caches of the media delivery system of FIG. 1 according to one example embodiment.

FIG. 3 is a block diagram of one of the caches 120 of the system 100 according to one example embodiment. In the example shown, the cache 120 includes a second electronic processor 305 electrically connected to a second memory 310 and a second network interface 315. These components are similar to the like-named components of the user device 130 explained above with respect to FIG. 2 and function in a similar manner as described above. In some embodiments, the second network interface 315 sends and receives data to and from user device 130 via one or more the communication links 132. In some embodiments, the cache 120 includes fewer or additional components in configurations different from that illustrated in FIG. 3. For example, the cache 120 may additionally include a display such as a touch screen to allow a backend user to reprogram settings or rules of the cache 120. In some embodiments, the cache 120 performs functionality other than the functionality described below.

In some embodiments, other caches 120 and/or other components of the system 100 (e.g., the origin device 105, peer devices 125, etc.) include similar elements as those described above with respect to the user device 130 of FIG. 2 and/or the cache 120 of FIG. 3. In some embodiments, a user device 130 may also act as a peer device 125 that provides caching functionality as described in greater detail below.

While FIGS. 2 and 3 show separate block diagrams of the user device 130 and the one of the caches 120, in some embodiments, the user device 130, the origin device 105, one or more caches 120, one or more peer devices 125, or a combination thereof may be referred to as an electronic computing device that performs the functionality described herein. For example, the electronic computing device may be a single electronic processor (for example, the second electronic processor 305 of a cache 120) or a plurality of electronic processors located in the cache 120 or the origin device 105. In other embodiments, the electronic computing device includes multiple electronic processors distributed across different devices. For example, the electronic computing device is implemented on a plurality of second electronic processors 305 distributed throughout multiple caches 120 within a network.

FIGS. 4A-4C illustrate flowcharts of three main phases of overall data processing and transmission for delivering media content from the origin device 105 to the user device 130 according to one example embodiment. The three main phases include an origin distribution method 400 of FIG. 4A, an in-network redistribution method 430 of FIG. 4B, and a multi-source multi-path download method 460 of FIG. 4C. The methods 400, 430, and 460 are high level methods that indicate general end-to-end media delivery steps that are explained in greater detail below and with respect to additional figures.

In some embodiments, the origin distribution method 400 is performed by the origin device 105 to create different functionally equivalent variants (e.g., full or partial) representing a first media asset (e.g., the original media file 110 of FIG. 1) for connected caches 120 (e.g., caches 120A-120D of FIG. 1) based on the storage budget of each respective connected cache 120. In some embodiments, the in-network redistribution method 430 is performed by caches 120 not connected to the origin device 105 (e.g., caches 120E and 120F of FIG. 1) to download coded information included in coded variants from a set of existing caches 120 (e.g., caches 120A-120D) to create their own functionally equivalent coded variants. In some embodiments, the multi-source multi-path download method 460 is performed by the client device 130 to simultaneously download coded information included in coded variants from multiple caches 120 and terminate downloading of information in response to determining that sufficient information has been obtained to decode the first media asset (e.g., the original media file 110 of FIG. 1).

With reference to FIG. 4A, in some embodiments, the method 400 is performed by the origin device 105 (i.e., a first device). At block 405, an electronic processor of the origin device 105 generates a plurality of network-coded symbols (i.e., coded symbols) from a plurality of original symbols representing a first media asset. In some embodiments, the plurality of original symbols are generated by partitioning an original version of the first media asset (e.g., the original media file 110 of FIG. 1) into equal length symbols (e.g., an amount "K" of equal length symbols as explained in greater detail below with respect to FIG. 5). This partitioning of the original first media asset to generate the plurality of original symbols may be performed by the origin device 105 or by a device upstream of the origin device 105 such that the origin device 105 merely receives the plurality of original symbols.

In some embodiments, at block 410, the origin device 105 generates an original plurality of coded variants of the first media asset. In some embodiments, each coded variant includes one or more symbols that include at least one of (i) one or more original symbols of the plurality of original symbols and (ii) one or more network-coded symbols of the plurality of network-coded symbols. Generation of the coded variants is explained in further detail below with respect to FIG. 5.

In some embodiments, the origin device 105 is configured to distribute different coded variants to numerous different caches 120 that are communicatively coupled to the origin device 105 (e.g., caches 120A-D in FIG. 1). For example, at block 415, the origin device 105 may distribute a first coded variant (e.g., code variant 135A) of the original plurality of coded variants to a first cache 120 (e.g., cache 120B) on a first server device (e.g., cache cluster 115A) for storage in the first cache 120. As another example, at block 420, the origin device 105 may distribute a second coded variant (e.g., coded variant 135B) of the original plurality of coded variants to a second cache 120 (e.g., cache 120D) on a second server device (e.g., cache cluster 115B) for storage in the second cache 120. In some embodiments, the first cache 120 is part of a first access network (e.g., a 3rd Generation Partnership Project (3GPP) network, a fifth generation (5G) mobile network, a sixth generation (6G) mobile network, another mobile network or the like), and the second cache 120 is part of a second access network different from the first access network (e.g., a different 3GPP network, 5G network mobile network, 6G mobile network, another mobile network, or the like). Accordingly, the origin device 105 may communicate over different access networks to distribute coded variants to various caches 120 for storage in the caches 120. In some embodiments, the distribution of coded variants to caches 120 over different access networks may be referred to as hybrid distribution or distribution occurring in a hybrid manner.

With reference to FIG. 4B, in some embodiments, the method 430 is performed by the second electronic processor 305 of one or more caches 120 that are not communicatively connected to the origin device 105 (e.g., caches 120E and 120F of FIG. 1). In some embodiments, at block 435, the one or more caches 120 not connected to the origin device 105 determine a respective storage budget for the first media asset. For example, each of the caches 120 may determine an amount of storage space within the second memory 310 that the respective cache 120 will allocate for the purpose of storing coded information included in a coded variant of the first media asset (e.g., the original media file 110).

In some embodiments, at block 440, the one or more caches 120 not connected to the origin device 105 (e.g., caches 120E and 120F of FIG. 1) download one or more coded variants from other caches 120 (e.g., caches 120C and 120D of neighboring cache cluster 115B of FIG. 1) such that an amount of coded information included in the downloaded one or more coded variants corresponds to the respective storage budget of the cache 120. In some embodiments, at block 445, the one or more caches 120 not connected to the origin device 105 generate new coded variants of the first media asset using the coded information included in the downloaded one or more coded variants. The one or more caches 120 not connected to the origin device 105 may then store these new coded variants for future access by other caches 120 and/or client devices 130. In some embodiments, multiple caches 120 of the one or more caches 120 not connected to the origin device 105 are part of different access networks than each other (e.g., a different 3GPP network, 5G network mobile network, 6G mobile network, another mobile network, or the like). Accordingly, similar to the hybrid distribution situation described above with respect to FIG. 4A, the caches 120 connected to the origin device 105 may communicate over different access networks to distribute coded variants to various caches 120 not connected to the origin device 105 for storage in the caches 120 not connected to the origin device 105. In other words, the caches 120 connected to the origin device 105 can engage in hybrid re-distribution of coded variants to other caches 120.

Similarly, from the perspective of a cache 120 not connected to the origin device 105, this cache 120 may download coded variants from a first cache 120 that is part of a first access network (e.g., a 3GPP network, 5G network mobile network, 6G mobile network, another mobile network, or the like) and from a second cache that is part of a second access network different from the first access network (e.g., a different 3GPP network, 5G network mobile network, 6G mobile network, another mobile network, or the like). Accordingly, the cache 120 not connected to the origin device 105 may communicate over the first access network to download a first coded variant from the first cache 120 and may communicate over the second access network to download a second coded variant from the second cache 120. In other words, the cache 120 not connected to the origin device 105 may communicate over different access networks to download coded variants from various caches 120 (i.e., downloading coded variants in a hybrid manner).

With reference to FIG. 4C, in some embodiments, the method 460 is performed by the client device 130. In some embodiments, at block 465, the first electronic processor 205 of the client device 130 transmits a request (e.g., via the first network interface 215) for consumption of the first media asset (e.g., the original media file 110) to a plurality of caches 120 (e.g., caches 120A, 120C, and 120E of FIG. 1). As indicated by the methods 400 and 430 described above, in some embodiments, a coded variant of the first media asset may be stored in each cache 120 of the plurality of caches 120. In some embodiments, each coded variant includes one or more symbols that each represent an original symbol of the first media asset. In some embodiments, each coded variant is functionally-equivalent such that an amount of any data that exceeds a threshold amount of data and that is drawn from any one or more coded variants allows for decoding of the amount of any data to recover the first media asset (e.g., the original media file 110), for example, as described in U.S. application Ser. No. 15/405,874, filed Jan. 13, 2017, now U.S. Pat. No. 10,581,554; U.S. application Ser. No. 16/750,185, filed Jan. 23, 2020; and U.S. application Ser. No. 16/634,568, filed Jan. 27, 2020, the entire contents of each of which are hereby incorporated by reference.

In some embodiments, at block 470, the client device 130 downloads a first coded variant (e.g., coded variant 140B) from a first cache (e.g., cache 120C) of the plurality of caches 120 via a first communication link. In some embodiments, at block 475, the client device 130 downloads a second coded variant (e.g., coded variant 135F) from a second cache (e.g., cache 120E) via a second communication link different from the first communication link. In some embodiments, the first cache 120 is part of a first access network (e.g., a 3GPP network, 5G network mobile network, 6G mobile network, another mobile network, or the like), and the second cache 120 is part of a second access network different from the first access network (e.g., a different 3GPP network, 5G network mobile network, 6G mobile network, another mobile network, or the like). Accordingly, the client device 130 may communicate over the first access network to download the first coded variant from the first cache 120 and may communicate over the second access network to download the second coded variant from the second cache 120. In other words, the client device 130 may communicate over different access networks to download coded variants from various caches 120 (i.e., downloading coded variants in a hybrid manner).

In some embodiments, the second coded variant (e.g., coded variant 135F) is received concurrently with the first coded variant (e.g., coded variant 140B). In other words, blocks 470 and 475 may be performed concurrently in some embodiments. For example, the client device 130 may communicate concurrently over different access networks in some situations.

In some embodiments, the second coded variant is received after the first coded variant. Continuing the above example that includes the first and second access networks, the second coded variant may be received after the client device 130 has disconnected from a first access network and connected to a second access network, for example, as explained below. In some embodiments, the client device 130 may be a mobile device such as a smart phone. At a first location, the client device 130 may connect to the first access network to communicate over the first access network to download the first coded variant from the first cache 120. The client device 130 may then move to another location such that a transition/hand-off of management of communication of the client device 130 occurs (e.g., management of communication of the client device 130 is switched to being handled by another entity). For example, the client device 130 may move from one cell/coverage area to another cell/coverage area such that management of communication of the client device 130 switches from being handled by a first base station of a first cell to being handled by a second base station of a second cell. In some embodiments, communication through the first base station may be considered communication over the first access network, and communication over the through the second base station may be considered communication over the second access network. In some situations, the first and second base stations may not have access to the exact same caches 120. In other words, a cache 120 may be accessible to the client device 130 over the first access network but not over the second access network. In some embodiments, a cache 120 may be accessible to the client device 130 over both access networks, but continuing an in-progress download over the first access network after connecting to the second access network may require additional scheduling to occur between the two base stations during transition/hand-off.

However, these problems are overcome by the hybrid nature of downloading that occurs in the communication system 100 where functionally equivalent coded variants can be downloaded from any source. Due to this hybrid downloading process, the client device 130 may merely disconnect from the first access network and connect to the second access network in response to the client device 130 moving from a first coverage area of the first access network to a second coverage area of the second access network. The client device 130 may then download the second coded variant from the second cache 120 over the second access network without having to continue the in-progress download of the first coded variant from the first cache 120 over the first access network. Accordingly, the system 100 does not have to engage in complex scheduling between the two access networks to continue an in-progress download over the first access network. Rather, the system 100 allows for seamless download of coded symbols/variants by a mobile client device 130 entering and leaving different access networks over time.

In some embodiments, at block 480, the client device 130 decodes at least some of one or more symbols included in at least one of the first coded variant and the second coded variant to recover the first media asset (e.g., the original media file 110). In some embodiments, at block 485, the client device 130 outputs the first media asset (e.g., the original media file 110) on a output device of the client device 130 (e.g., using the speaker 225 and/or the display 230).

In some embodiments, the in-network redistribution method 430 and the multi-source multi-path download method 460 may occur concurrently/in parallel. In some embodiments, the multi-source multi-path download method 460 is initiated in accordance with a determination that a client device 130 is requesting consumption of a representation of a first media asset (e.g., the original media file 110). For example, the client device 130 may transmit a request for the first media asset to a connected CDN (e.g., cache cluster 115A of FIG. 1). In some embodiments, a client device request for media content from a CDN is intercepted prior to being delivered to the CDN. In such embodiments, the client device request is replaced with (e.g., translated into) multiple requests to specified caches 120 within one or more CDNs that include coded variants corresponding to the requested media content. In some embodiments, a CDN receiving the client device request may generate multiple requests to the specified caches 120 noted above to allow the client device 130 to engage in multi-source multi-path downloading of coded information included in coded variants of multiple caches 120.

FIG. 5 illustrates a flowchart of a method 500 for encoding and distributing media content from the origin device 105 according to one example embodiment. In some embodiments, the method 500 is a more detailed method of the origin distribution method 400 of FIG. 4A and may be performed as part of the method 400 of FIG. 4A. In some embodiments, most or all of the blocks of the method 500 are executed by an electronic processor of the origin device 105.

In some embodiments, at block 505, the origin device 105 partitions a first media asset (e.g., the original media file 110) into equal-length symbols (i.e., data blocks). For example, the origin device 105 treats the first media asset (e.g., a source-encoded media file) as a byte stream and partitions the first media asset into "K" equal-length symbols using an upstream media source coding and/or packaging step (e.g., Moving Picture Experts Group (MPEG) video, etc. with and without MPEG DASH (dynamic adaptive streaming over HTTP (hypertext transfer protocol)) or HTTP live streaming (HLS) packaging). In some embodiments, auxiliary bytes may be attached to the first media asset to enable an equal-length partition. In some embodiments, the number "K" of symbols is selected to take advantage of variable metrics such as computational complexity and header overhead. As noted above, in some embodiments, block 505 is performed by a device upstream of the origin device 105 rather than being performed by the origin device 105 itself. In some embodiments, the first media asset is a portion of a larger/full media asset (e.g., a portion of the original media file 110).

In some embodiments, at block 510, the origin device 105 creates a certain amount (K') of coded symbols (i.e., network-coded symbols) from the original K symbols using a network code. The origin device 105 may create K' coded symbols for each cache 120 based on a storage budget of the respective cache 120 for a coded variant of the first media asset (e.g., the original media file 110). In other words, the amount K' of coded symbols created for each cache 120 may correspond to an amount of storage space (i.e., storage budget) that each cache 120 has allocated to store information associated with the first media asset. For example, the origin device may generate an original plurality of coded variants (i) such that a first coded variant includes a first predetermined amount of symbols based on a first storage budget of the first cache 120 and (ii) such that a second coded variant includes a second predetermined amount of symbols based on a second storage budget of the second cache 120. In some embodiments, the storage budgets of the first cache 120 and the second cache 120 may be different or the same.

In some embodiments, K' is less than or equal to K. For example, when K' is equal to K for a given cache 120, that cache 120 has allocated enough space in its second memory 310 to store a full coded variant 135 that includes K symbols. On the other hand, when K' is less than K for a given cache 120, that cache 120 has allocated enough space in its second memory 310 to store only a partial coded variant 140 that includes less than K symbols. In some embodiments, caches 120 may provide their respective storage budgets for the first media asset to the origin device 105 prior to the origin device 105 performing block 510. In some embodiments, the network coding performed by the origin device 105 at block 510 may include any erasure or network codes. For example, the origin device 105 may use linear block codes (e.g., low-density parity-check (LDPC) code), linear rateless codes (e.g., fountain codes), network codes (e.g., Random Linear Network Codes), etc. In some embodiments, one or more of the original K symbols (i.e., one or more uncoded symbols) may be included in the symbols (i.e., the K' coded symbols) that make up a coded variant.

In some embodiments, at block 515, the origin device 105 forms a coded variant (e.g., a functionally-equivalent coded variant) by attaching headers to the K' coded symbols for each cache 120. In some embodiments, the headers allow for identification (e.g., by adding the file name or file ID), decoding (e.g., by adding the linear coefficients), and/or validation (e.g., by adding a file hash or original packet hash) of the coded variant. In some embodiments, the headers include packet headers for each coded symbol and a block header for each coded variant.

In some embodiments, at block 520, the origin device 105 transmits the coded variants to caches 120 for storage by the caches 120. In some embodiments, each cache 120 stores one coded variant (either partial or full) representing the first media asset. The origin device 105 may transmit the coded variants to caches 120 over the communication links 132 using a communication protocol (e.g., transmission control protocol (TCP) or the like).

In some embodiments, unique coded symbols within each coded variant are distributed to each cache 120 to guarantee the innovativeness (e.g., linear independence) of the coded symbols, thereby guaranteeing the functional equivalence of each coded variant. In other words, each coded variant may be functionally-equivalent such that an amount of any data that exceeds a threshold amount of data and that is drawn from any one or more coded variants from any caches 120 allows for decoding of the amount of any data to recover the first media asset (e.g., original media file 110). For example, as long as the client device 130 receives an amount K of coded symbols from any one or more caches 120, the client device 130 will be able to decode the K coded symbols to recover the first media asset (e.g., original media file 110).

In some embodiments, uniqueness of coded symbols is synonymous with linear independence of coded symbols. In some embodiments, one or more coded symbols in each coded variant is linearly independent from each of the other one or more coded symbols in the respective coded variant and/or in other coded variants (e.g., stored at other caches 120). In some embodiments, linear independence means that each coded symbol within a group of coded symbols (e.g., within a coded variant and/or within all coded variants within the system 100) are unique/linearly independent from all other coded symbols within the group of coded symbols. For example, a coded symbol is linearly independent to a set of given coded symbols if the coded symbol (i) cannot be generated using these given symbols (e.g., this symbol is linearly independent of the vector space spanned by the set of coded symbols, so that it cannot be generated by linearly combining the given symbols) and (ii) can be generated using the K original symbols, meaning that it is a useful symbol. Additional details of unique/innovative coded symbols are described in U.S. application Ser. No. 15/405,874, filed Jan. 13, 2017, now U.S. Pat. No. 10,581,554 and U.S.

application Ser. No. 16/750,185, filed Jan. 23, 2020, the entire contents of each of which are hereby incorporated by reference.

In some embodiments, linear independence means that each coded symbol within a group of coded symbols is unique/linearly independent from most other coded symbols within the group of coded symbols (e.g., greater than 99%, 95%, 90%, etc. of coded symbols are linearly independent from each other). In other words, in some embodiments, a small percentage of the coded symbols within a group of coded symbols may not be linearly independent, but the group of coded symbols may nevertheless be considered a group of linearly independent coded symbols. In some embodiments, linear independence means that each coded symbol generated within a group of coded symbols has a high probability (e.g., a probability above a predetermined threshold such as 99%, 95%, 90%, etc.) of being unique/linearly independent from other coded symbols within the group of coded symbols. For example, this probability may be based on a type of network coding that is used to generate the coded symbols.

Figure 6:
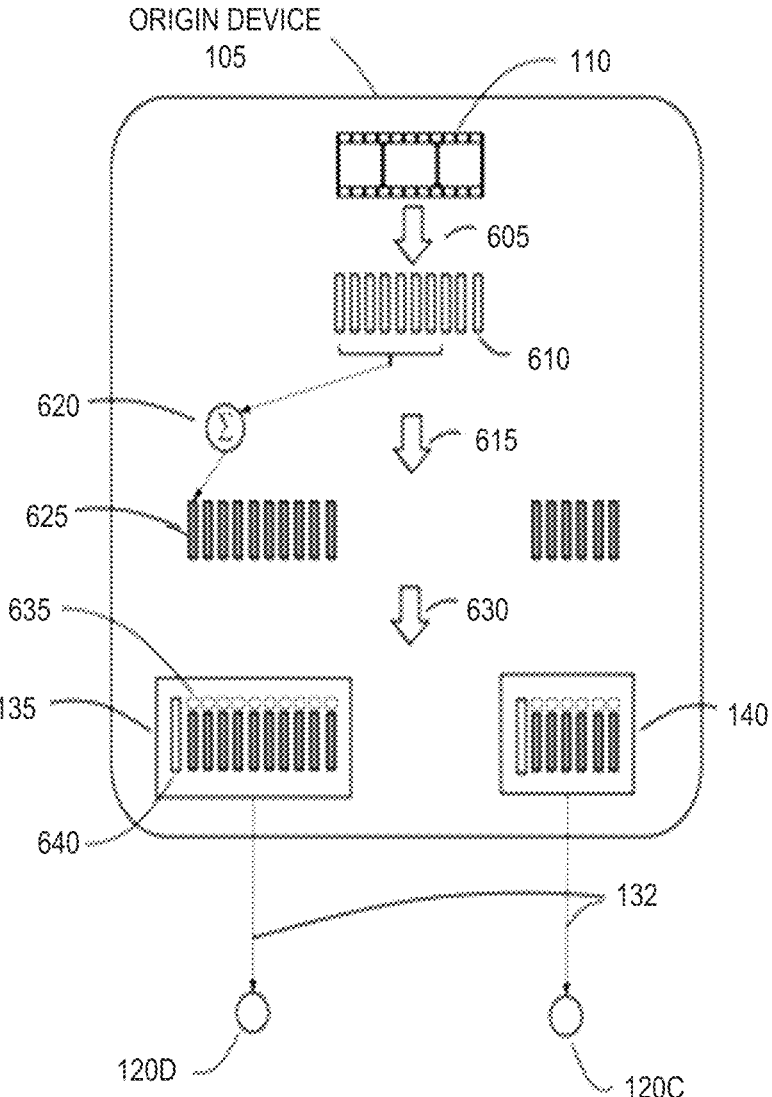
FIG. 6 illustrates an example instance of server-side encoding of a first media asset that may occur at the origin device of the system of FIG. 1 according to one example embodiment.

FIG. 6 illustrates an example instance of server-side encoding of the first media asset (e.g., the original media file 110) that may occur at the origin device 105 according to one example embodiment. In other words, FIG. 6 illustrates a specific example implementation of the method 500 of FIG. 5.

As shown in FIG. 6, the origin server 105 may partition (at step 605) the original media file 110 into K=10 equal-length original symbols 610. The origin server may then use these symbols 610 to create coded symbols 625 (i.e., network-coded symbols 625) using network coding (at step 615). In some embodiments, the network coding 615 involves the use of an encode function 620. For example, a coded symbol 625 may be encoded through the use of a bit-wise XOR function of the first eight original symbols 610. Additional examples of network coding were provided previously herein with respect to block 510 of FIG. 5. Additional details of network coding are described in U.S. application Ser. No. 15/405,874, filed Jan. 13, 2017, now U.S. Pat. No. 10,581,554 and U.S. application Ser. No. 16/750,185, filed Jan. 23, 2020, the entire contents of each of which are hereby incorporated by reference.

For a cache 120 that has full storage budget of K'=10 (e.g., cache 120D of FIG. 1), the origin server 105 creates ten coded symbols 625 as shown on the left side of FIG. 6. For a cache 120 that has a lower storage budget of, for example, six coded symbols 625, the origin device 105 creates another six innovative coded symbols 625 as shown on the right side of FIG. 6. At step 630, the origin device 105 packages the created coded symbols 625 into coded variants 135, 140. To do so, the origin device 105 adds appropriate packet headers 635 to each coded symbol 625 to create coded packets and adds an appropriate block header 640 to each set of coded packets to form a functionally equivalent coded variant 135, 140. Two functionally-equivalent coded variants 135, 140 are shown in the example of FIG. 6. The coded variant 135 is a full coded variant because it includes K=10 coded symbols 625. The coded variant 140 is a partial variant because it includes less than K coded symbols 625. The coded variants 135, 140 may be transmitted to corresponding caches 120 (e.g., caches 120D and 120C of FIG. 1) via the communication channels 132 of FIG. 1.

FIG. 7 illustrates a flowchart of a method 700 for creating a functionally-equivalent coded variant at a new cache 120 (e.g., caches 120E and/or 120F of cache cluster 115C of FIG. 1) without connecting to the origin server 105 according to one example embodiment. In some embodiments, the method 700 is a more detailed method of the in-network redistribution method 430 of FIG. 4B and may be performed as part of the method 430 of FIG. 4B. In some embodiments, most or all of the blocks of the method 700 are executed by a second electronic processor 305 of a cache 120 that is not connected with the origin device 105 (e.g., caches 120E and/or 120F of FIG. 1).

In some embodiments, at block 705, the cache 120 determines a storage budget of its memory 310 where the storage budget indicates an amount of memory space to be allocated to store information associated with a first media asset (e.g., the original media file 110). For example, assuming that the first media asset includes an amount K of original symbols as was used in previous examples herein, the storage budget for the cache 120 may be K', which may be less than or equal to K. The storage budget may be a percentage of the entire first media asset. The storage budget may be determined based on information received by the cache 120 from other components of the system 100 that indicates which media content should be pre-cached by the cache 120 (e.g., a popular video that has recently been requested to be viewed by a large number of client devices 130). In some embodiments, the storage budget and/or media content to be pre-cached are determined based on media content that was previously downloaded by the cache 120 in response to a request from a client device 130.

In some embodiments, at block 710, the cache 120 discovers and connects to one or more other caches 120 (e.g., caches 120C and/or 120D of neighboring cache cluster 115B of FIG. 1) that have stored coded variants representative of the first media asset. To discover one or more other caches 120 that have stored coded variants representative of the first media asset, the cache 120 may use manifest parsing, domain name system (DNS) lookup, peer discovery, variants coefficient comparison, cache lineage tracking, etc.). In some embodiments, at block 715, the cache 120 requests the coded variant stored by each of the other caches 120 (e.g., the coded variant 140B from cache 120C of FIG. 1 among other coded variants from other caches 120). In some embodiments, the cache 120 simultaneously requests the headers and coded symbols of the coded variants stored in a plurality of other caches 120. In response to receiving this request from the cache 120, each of the other caches 120 that have stored coded variants representative of the first media asset transmit the headers and the coded symbols of their stored coded variant to the cache 120. In some embodiments, when the one or more of the other caches 120 has computational ability, the cache 120 may request (at block 715) that the one or more other caches 120 transmit a re-encoded variant (including re-encoded symbols and new headers) that is generated by the one or more caches 120 using network coding based on the coded symbols included in its respective stored coded variant. Such re-encoding may increase a chance that the cache 120 downloads linearly independent coded symbols from the other caches 120 that have computational ability.

In some embodiments, at block 720, the cache 120 determines that it has received at least a threshold amount of coded symbols from the other caches 120. The threshold amount may correspond to the storage budget of the memory 310 of the cache 120. For example, the threshold amount may be equal to the storage budget K' or may be equal to the storage budget K' plus some predetermined amount to ensure that at least an amount of K' coded symbols are received from the other caches 120. In some embodiments, the threshold amount may be equal to the amount K (e.g., ten) of original symbols into which the first media asset was partitioned (e.g., in embodiments where the cache 120 is configured to fully decode the first media asset and re-encode new symbols from the decoded original symbols such as described below with respect to FIG. 8).

In response to determining that the cache 120 has received at least the threshold amount of coded symbols from the other caches 120, at block 725, the cache 120 may cease downloading of the symbols of the coded variants stored in the other caches 120. In some embodiments, the cache 120 may cease downloading of the symbols of the coded variants stored in other caches in response to determining that at least the threshold amount of coded symbols is in route to the cache 120 from the other caches 120. For example, the cache 120 may have knowledge (through communication with the other caches 120) that at least the threshold amount of coded symbols has been transmitted by the other caches 120 even though all such symbols have not yet been received. In some embodiments, the cache 120 may cease downloading coded symbols in response to receiving at least an amount K' coded symbols and at most an amount K coded symbols.

In some embodiments, at block 730, the cache 120 creates recoded symbols based on the received coded symbols from the other caches 120. In some embodiments, to create the recoded symbols, the cache 120 may first decode the coded symbols (i.e., network-coded symbols) from the other caches 120. In other words, the cache 120 may decode network-coded symbols from one or more first coded variants from the other caches 120 to determine the original symbols represented by the network-coded symbols from the one or more first coded variants. For example, the cache 120 may download an amount K coded symbols that corresponds to the amount of original symbols into which the first media asset was initially partitioned. The cache 120 may use the coded symbols to decode the K original symbols. The cache 120 may then generate, using network coding, one or more first recoded symbols (e.g., an amount K' of recoded symbols) from the original symbols represented by the network-coded symbols from the one or more first coded variants (for example, see FIG. 8).

In some embodiments, to create the recoded symbols, the cache 120 may not decode the coded symbols from the other caches 120. For example, the cache 120 may generate, using network coding, one or more first recoded symbols from the network-coded symbols from the one or more first coded variants received from the other caches 120 (for example, see FIG. 9).

Regardless of whether of the coded symbols from the other caches 120 are decoded before the cache 120 creates the one or more first recoded symbols (i.e., re-encoded symbols), in some embodiments, at block 735, the cache 120 packages the recoded symbols into a new coded variant (i.e., a recoded variant or a re-encoded variant) to be stored in the cache 120 (e.g., in the memory 310). In other words, the cache 120 generates a recoded variant (representative of the first media asset) where the recoded variant includes one or more recoded symbols. For example, the cache 120 adds appropriate packet headers and block headers to the recoded symbols to form its own recoded variant in a similar manner as described above with respect to FIG. 6 regarding the initial generation of coded variants by the origin device 105. Like the coded symbols of the coded variants received from other caches 120, the cache 120 generates the recoded variant to be functionally-equivalent/linearly independent to the coded variants of the other caches 120 (e.g., functionally-equivalent/linearly independent to an original plurality of coded variants that were generated by the origin device

120 and distributed to the other caches 120). In other words, similar to the original plurality of coded variants explained previously herein, an amount of any data that exceeds a threshold amount of data and that is drawn from the first recoded variant or any one or more other coded variants allows for decoding of the amount of any data to recover the first media asset.

Although not shown in FIG. 7, in some embodiments, the cache 120 may register the newly created recoded variant that it is storing as a functionally-equivalent copy so that other caches 120 and/or client devices 130 may discover and download the recoded variant. In some embodiments, the cache 120 distributes the recoded variant to yet another cache 120 on a first server device (e.g., cache cluster 115), the second server device (e.g., cache cluster 115), or an additional server device (e.g., cache cluster 115) for storage in the yet another cache 120. In some embodiments, the yet another cache 120 does not have a direct communication path with or access to the origin device 105 (e.g., cache 120E and 120F of FIG. 1). Accordingly, the yet another cache 120 may download a coded variant or a recoded variant from other caches 120 that may have a direct communication path with or access to the origin device 105 (i.e., first device).

In some embodiments, any cache 120 may perform the method 700 of FIG. 7. For example, the method 700 may be performed (i) by caches 120 that directly receive a coded variant from the origin device 105 to generate their own recoded variant and/or (ii) by caches that do not have a direct communication path with or access to the origin device 105 and that receive coded variants and/or recoded variants from other caches 120 to generate their own recoded variant. In some embodiments, one or more client devices 130 may act as a peer device 125 that performs similar coded variant storage functionality as the caches 120. Accordingly, in some embodiments, one or more client devices 130 and/or peer devices 125 may perform the method 700 to generate their own recoded variant that may be discoverable by other caches 120, peer devices, 125, and/or client devices 130.

In some embodiments, one or more devices of the system 100 may determine to delete stored coded variants of various media content from the caches 120. For example, a cache 120 itself may change its storage budget for the first media asset such that some or all of the symbols included in its coded variant for the first media asset are deleted to account for the changed storage budget for the first media asset. Similarly, a cache 120 may receive an instruction from another device (e.g., the origin device 105 or a client device 130) that indicates that some or all of the symbols included in its coded variant for the first media asset should be deleted (for example, because a threshold amount of neighboring caches 120/peer devices 125 are storing coded variants representative of the first media asset). As indicated by the above examples, the storage of coded symbols within coded variants on different devices throughout the system 100 is dynamic in nature (i.e., capable of expanding and contracting) depending on how many devices are available to function as caches, the size of the storage budget of each such device, a demand from client devices 130 for certain media content, etc.

Figure 8:
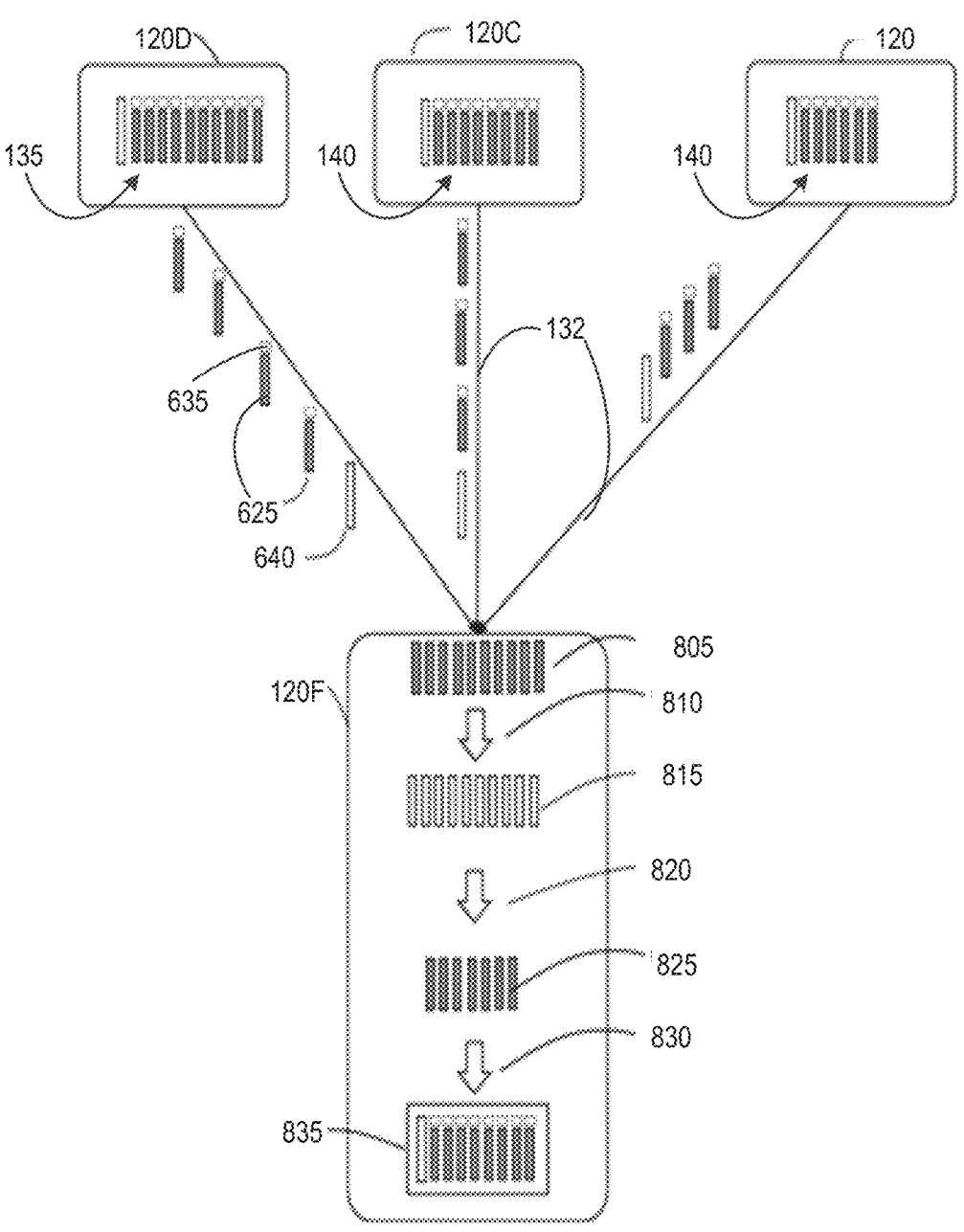
FIG. 8 illustrates an example instance of in-network re-encoding of a first media asset that may occur at a cache, a peer device, and/or a client device of the system of FIG. 1 according to one example embodiment.

FIG. 8 illustrates an example instance of in-network re-encoding of the first media asset (e.g., the original media file 110) that may occur at a cache 120, a peer device 125, and/or a client device 130 according to one example embodiment. In other words, FIG. 8 illustrates a specific example implementation of the method 700 of FIG. 7 that creates a recoded variant 835 via decoding and encoding as described above with respect to block 730 of FIG. 7. In the example shown in FIG. 8, the cache 120F of FIG. 1 creates the recoded variant 835 as described in further detail below.

In the example shown in FIG. 8, the cache 120F has a storage budget of K'=7 coded symbols for the first media asset. After performing discovery of caches 120 that include coded variants representative of the first media asset (at block 710 of FIG. 7), the cache 120F connects to three neighboring caches 120 (e.g., caches 120C and 120D as well as one additional cache 120). In the example shown in FIG. 8, the cache 120D has stored a full variant 135 (including K=10 coded symbols), and the cache 120C and the other cache 120 each have a stored partial variant 140 (including K' coded symbols where K' is less than ten). Additionally, in the example shown in FIG. 8, none of the caches 120D, 120C, or 120 have computational ability (i.e., they may only be able to store coded variants without being able to re-encode coded symbols to create recoded symbols or a recoded variant).

Once connected to the caches 120C, 120D, and 120, the cache 120F may request and/or download (at block 715 of FIG. 7) the headers 640 and coded symbols 625 (including packet headers 635) of the three caches 120C, 120D, and 120 via different communication links 132. In some embodiments, the different communication links include at least one of (i) different channels of a single communication modality (i.e., multiple path), and (ii) different communication modalities (i.e., multiple access). For example, the communication links 132 may include a plurality of network access types/technologies, mobile wireless communication links (e.g., a 3GPP network, 5G network mobile network, 6G mobile network, another mobile network, or the like), WiFi communication links, satellite communication links, broadband communication links, etc. In some embodiments, each communication modality may allow communication to occur between two or more devices according to a respective set of rules and using certain hardware (e.g., WiFi radio versus cellular, different access networks, etc.). In some embodiments, even if two different communication links 132 converge somewhere within the network, these communication links 132 may still be considered different as long as some portions of the communication links 132 from source-to-destination are different from each other. In some embodiments, different communication links 132 may include different routes through a collection of communications links 132 (e.g., a network).

In some embodiments, in response to the requesting cache 120F receiving K=10 coded symbols 805 (i.e., the amount of symbols into which the first media asset was initially partitioned), the cache 120F terminates the downloads from each of the other caches 120C, 120D, and 120 (at block 725 of FIG. 7). In some embodiments, the cache 120F then creates its own coded symbols 825 by first decoding (at step 810) the K coded symbols 805 to recover the K original symbols 815. The cache 120F may then encode the K original symbols 815 (at step 820), for example using network coding or erasure coding to generate an amount K' of new recoded symbols 825 in accordance with its storage budget (at block 730 of FIG. 7). As explained above, in some embodiments, the recoded symbols 825 are functionally-equivalent/linearly independent to the coded symbols of the other caches 120 (e.g., functionally-equivalent/linearly independent to an original plurality of coded symbols that were generated by the origin device 120 and distributed to the other caches 120).

In some embodiments, the cache 120F may then package the recoded symbols 825 into a recoded variant 835 by, for example, adding appropriate headers (see step 830 of FIG.

8 and block 735 of FIG. 7). As explained above, in some embodiments, the recoded variant 835 may be functionally-equivalent/linearly independent to the coded variants 135, 140 of the other caches 120 (e.g., functionally-equivalent/linearly independent to an original plurality of coded variants that were generated by the origin device 120 and distributed to the other caches 120).

Figure 9:
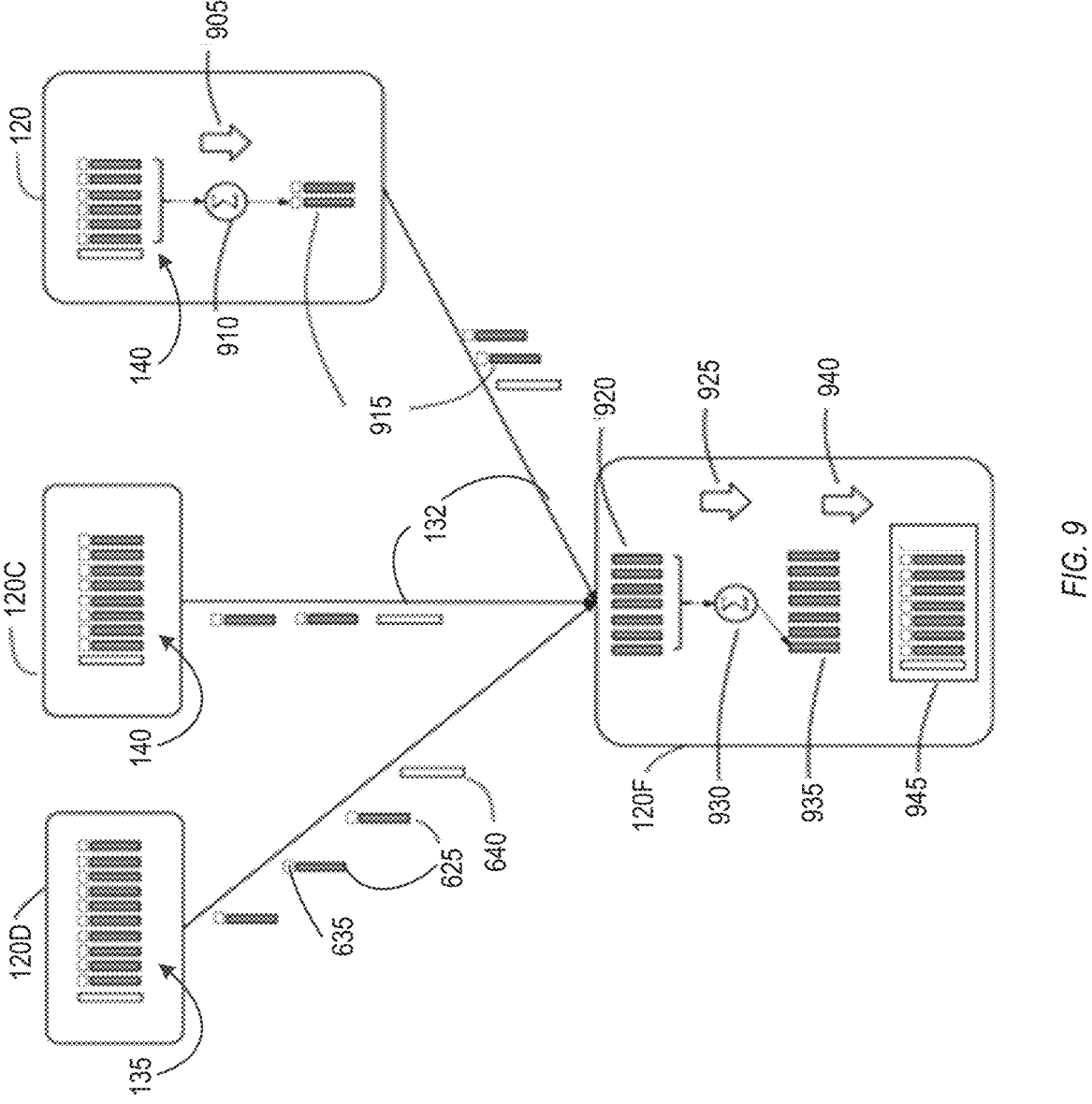
FIG. 9 illustrates another example instance of in-network re-encoding of the first media asset that may occur at a cache, a peer device, and/or a client device of the system of FIG. 1 according to one example embodiment.

FIG. 9 illustrates an example instance of in-network re-encoding of the first media asset (e.g., the original media file 110) that may occur at a cache 120, a peer device 125, and/or a client device 130 according to one example embodiment. In other words, FIG. 9 illustrates a another specific example implementation of the method 700 of FIG. 7 that creates a recoded variant 945 via direct recoding without decoding the received coded symbols from other caches 120 as described above with respect to block 730 of FIG. 7. In the example shown in FIG. 9, the cache 120F of FIG. 1 creates the recoded variant 945 as described in further detail below.

In the example shown in FIG. 9, the cache 120F still has a storage budget of K'=7 coded symbols for the first media asset (similar to the example implementation of FIG. 8). After performing discovery of caches that include coded variants representative of the first media asset (at block 710 of FIG. 7), the cache 120F connects to three neighboring caches 120 (e.g., caches 120C and 120D as well as one additional cache 120). In the example shown in FIG. 9, the cache 120D has stored a full variant 135 (including K=10 coded symbols), and the cache 120C and the other cache 120 each have a stored partial variant 140 (including K' coded symbols where K' is less than ten). Additionally, in the example shown in FIG. 9, the caches 120D and 120C do not have computational ability, but the cache 120 does have computational ability. For example, the cache 120 may be able to store a coded variant and also may be able to re-encode coded symbols to create recoded symbols or a recoded variant.

Once connected to the caches 120C, 120D, and 120, the cache 120F may request and/or download (at block 715 of FIG. 7) the headers 640 and coded symbols 625 (including packet headers 635) of the caches 120C and 120D via different communication links 132. In some embodiments, the cache 120F may request the other cache 120 to recode the symbols in its partial variant 140 before transmitting the symbols. In response to this request, the other cache 120 recodes the symbols in its partial variant 140 (at step 905) to generate one or more recoded symbols 915. In some embodiments, a coding function 910 (e.g., a bitwise XOR of all the coded symbols in the partial variant 140 of the other cache 120) may be used to generate the one or more recoded symbols 915. In some embodiments, the other cache 120 adds appropriate packet heads 635 to each of the one or more recoded symbols 915.

In some embodiments, in response to the requesting cache 120F receiving K'=7 coded symbols 920 (i.e., the amount of symbols corresponding to the storage budget of the cache 120F for the first media asset), the cache 120F terminates the downloads from each of the other caches 120C, 120D, and 120 (at block 725 of FIG. 7). In some embodiments, the cache 120F then creates its own coded symbols 935 by directly recoding (at step 925) the received K' coded and/or recoded symbols 920. For example, the cache 120F may directly recode the coded and/or recoded symbols 920 using network coding or erasure coding to generate an amount K' of new recoded symbols 935 in accordance with its storage budget (at block 730 of FIG. 7). In some embodiments, a coding function 930 (e.g., a bitwise XOR of all the symbols

920) may be used to generate the recoded symbols 935. As explained above, in some embodiments, the recoded symbols 935 are functionally-equivalent/linearly independent to the coded symbols of the other caches 120 (e.g., functionally-equivalent/linearly independent to an original plurality of coded symbols that were generated by the origin device 120 and distributed to the other caches 120).

In some embodiments, the cache 120F may then package the recoded symbols 825 into a recoded variant 935 by, for example, adding appropriate headers (see step 940 of FIG. 9 and block 735 of FIG. 7). As explained above, in some embodiments, the recoded variant 945 may be functionally-equivalent/linearly independent to the coded variants 135, 140 of the other caches 120 (e.g., functionally-equivalent/linearly independent to an original plurality of coded variants that were generated by the origin device 120 and distributed to the other caches 120).

Figure 10B:
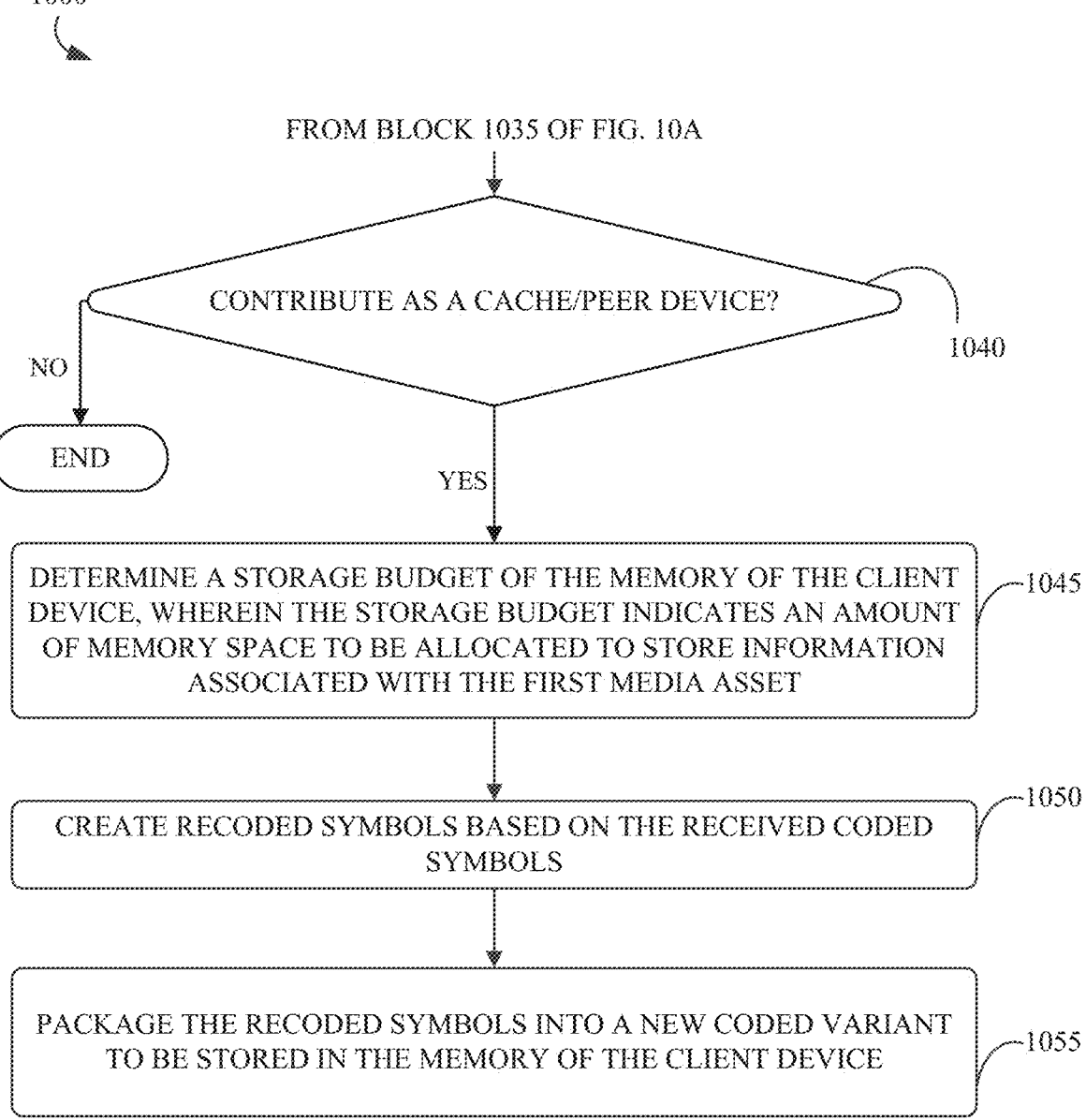

FIGS. 10A and 10B illustrate a flowchart of a method 1000 for downloading media content (e.g., the first media asset) in a multi-source, multi-path manner on a client device 130 according to one example embodiment. In some embodiments, the method 1000 is a more detailed method of the multi-source multi-path download method 460 of FIG. 4C and may be performed as part of the method 460 of FIG. 4C. In some embodiments, most or all of the blocks of the method 1000 are executed by a first electronic processor 205 of a client device 130. However, other devices acting as a client at a given time (e.g., a cache 120) may also perform the method 1000. In the below explanation of the method 1000, some of the steps performed by the client device 130 are similar to steps performed by the cache 120 as explained previously herein. For the sake of brevity, such steps will not be re-explained with respect to the method 1000 and only additional and/or different features of such steps will be explained. Additional details of multi-source multi-path downloading are described in U.S. application Ser. No. 15/405,874, filed Jan. 13, 2017, now U.S. Pat. No. 10,581, 554 and U.S. application Ser. No. 16/750,185, filed Jan. 23, 2020, the entire contents of each of which are hereby incorporated by reference.

In some embodiments, at block 1005, the client device 130 discovers a plurality of available caches 120 and identifies a plurality of caches 120 from the plurality of available caches 120 (i.e., a subset of caches 120 of the plurality of available caches 120) based on determining that each of the caches of the plurality of caches includes a coded variant of the first media asset (e.g., a coded variant representative of at least a portion of the original media file 110). In some embodiments, block 1005 is similar to block 710 of FIG. 7.

In some embodiments, at block 1010, the client device 130 connects to each of the plurality of caches 120 that have stored coded variants representative of the first media asset. For example, the client device 130 may connect to each of the plurality of caches 120 via different communication links 132 that were explained previously herein with respect to FIG. 8.

In some embodiments, at block 1015, the client device 130 requests the coded variant stored by each of the caches 120 of the plurality of caches 120. In some embodiments, block 1015 is similar to block 715 of FIG. 7. Additionally, as is evident from previous explanations herein, while the client device 130 is described as communicating with caches 120 at blocks 1005 through 1015, the client device 130 may also communicate with peer devices 125 (i.e., other client devices 130) that have decided to contribute as a cache device of the system 100. In other words, the term "cache" used throughout this disclosure should be understood to encompass the caches 120 described herein but also peer devices 125 (i.e., other client devices 130) that have allocated a portion of their memory space to serve as a cache to store, for example, at least a portion of the first media asset and other media assets.

In some embodiments, the client device 130 selects one or more caches 120 with which to connect based on at least one of (i) a quality of the communication link 132 between each cache 120 and the client device 130 and (ii) an amount of coded symbols within the coded variant representative of the first media asset that is stored by each cache 120. For example, the client device 130 may prioritize selection of caches 120 to which the client device 130 has a higher quality communication link and/or caches 120 that have a higher number of stored coded symbols representative of the first media asset.

As mentioned previously herein with respect to how the method 460 may be initiated, in some embodiments, a client device request for media content from a cache 120 is intercepted (for example, by a server device such as one of the cache clusters 115) prior to being delivered to the cache 120. In such embodiments, the client device request is replaced with (e.g., translated into) multiple requests to specified caches 120 within one or more server devices (e.g., CDNs) that include coded variants corresponding to the requested media content. In some embodiments, a cache 120 receiving the client device request may additionally or alternatively generate multiple requests to the specified caches 120 noted above to allow the client device 130 to engage in multi-source multi-path downloading of coded information (i.e., coded symbols) included in coded variants of multiple caches 120.

In response to receiving the request for its coded variant representing the first media asset, each of the plurality of caches 120 may initiate transmission of data including at least one of (i) a first network-coded symbol from its first coded variant and (ii) a first recoded symbol based on the first coded variant to the client device 130. In other words, a first cache 120 is configured to transmit first transmitted data including at least one of (i) a first network-coded symbol from the first coded variant and (ii) a first recoded symbol based on the first coded variant to the client device 130. Similarly, a second cache 120 is configured to transmit second transmitted data including at least one of (i) a second network-coded symbol from the second coded variant and (ii) a second recoded symbol based on the second coded variant to the client device concurrently with transmission of the first transmitted data from the first cache 120. In some embodiments, the first transmitted data and the second transmitted data are configured to be transmitted to the client device 130 via different communication links 132 as explained previously herein with respect to FIG. 8. In some embodiments, a single cache 120 may simultaneously/concurrently provide coded symbols of a coded variant representative of the first media asset to multiple connected client devices 130. In some embodiments, a single cache 120 may simultaneously/concurrently provide coded symbols of coded variants representative of different media assets to multiple connected client devices 130.

In some embodiments, at block 1020, the client device 120 downloads, from each of the caches 120 of the plurality of caches 120, coded and/or recoded symbols included in the respective coded and/or recoded variant (i.e., re-encoded variant) stored in each cache 120. It should be understood that references in this disclosure to a coded symbol may refer to both an initially coded symbol (encoded at the origin device 105) and a recoded/re-encoded symbol (recoded/re-encoded at a cache 120, a peer device 125, and/or a client device 130). Similarly, references in this disclosure to a coded variant may refer to both initially coded variants (encoded at the origin device 105) and recoded/re-encoded variants (recoded/re-encoded at a cache 120, a peer device 125, and/or a client device 130). The client device 120 may download the coded symbols from each cache 120 concurrently/simultaneously via different communication links 132 that were explained previously herein with respect to FIG. 8. In some embodiments, the plurality of caches 120 includes a first cache 120 (e.g., cache 120A) and a second cache (e.g., cache 120E).

In I some embodiments, downloading of a first coded variant (e.g., at least some first coded symbols of the first coded variant) from the first cache 120 and downloading of a second coded variant (e.g., at least some coded symbols of the second coded variant) from the second cache 120 occur without the first cache 120 and the second cache 120 receiving a portion of the first media asset after the request for consumption of the first media asset from the client device 130 is received by the first cache 120 and/or the second cache 120. Similarly, but stated in another way, the transmission of first transmitted data associated with the first media asset from the first cache 120 and the transmission of the second transmitted data associated with the first media asset from the second cache 120 occur without the first cache 120 and the second cache 120 receiving a portion of the first media asset after the request is received by the first cache 120 or the second cache 120. In other words, the coded variants representing the first media asset were already stored in the caches 120 at the time that the caches 120 received the request for consumption of the first media asset from the client device 130. Accordingly, the caches 120 provide a distributed and decentralized media content storage system 100 that allows for the client device 130 to more quickly and efficiently access media content compared to the caches 120 having to request the first media asset from the origin device 105 in response to receiving the request for the first media asset from the client device. For example, there is no complex scheduling of transmission of data from the caches 120 to the requesting client device 130 that is present in existing media delivery systems.

In some embodiments, at block 1025, the client device 130 determines that an amount of symbols that have been received from the caches 120 exceeds a threshold amount of symbols. In some embodiments, the threshold amount of symbols is based on an ability of the client device 130 to decode a full representation of the first media asset. In some embodiments, the threshold amount of symbols is based on a size of the first media asset. In some embodiments, block 1025 is similar to block 720 of FIG. 7 except that the threshold amount of symbols is the amount K (or K plus an additional amount) of symbols that first media asset was initially partitioned into by the origin device 105 since the client device 130 desires to recover the full first media asset. In other words, in some embodiments at block 720 of FIG. 7 such as the example shown in FIG. 9, the threshold amount of symbols may be an amount K' that is less than the amount K if the cache 120 performing the method 700 has a storage budget of K'<K. However, in some embodiments, at block 1025 of FIG. 10A, the threshold amount of symbols is always at least the amount K of symbols that first media asset was initially partitioned into by the origin device 105.

In some embodiments, at block 1025, the client device 130 may determine that at least the threshold amount of symbols is in route to the client device 130 from the caches 120. For example, the client device 130 may have knowledge that at least the threshold amount of symbols has been transmitted by the caches 120 even though all such symbols have not yet been received. As an example, the client device 130 may determine that an amount of symbols transmitted from at least one of a first cache 120 and a second cache 120 to the client device 130 exceeds the threshold amount of symbols. As noted above, in some embodiments, the threshold amount of symbols is based on an ability of the client device 130 to decode a full representation of the first media asset once the amount of symbols are received by the client device 130.

In some embodiments, at block 1030, in response to determining that the amount of symbols received (and/or in route to be received) exceeds the threshold amount of symbols, the client device 130 ceases downloading of the coded variants from the caches 120. For example, the client device 130 may cease downloading of at least one of a first coded variant from a first cache 120 and a second coded variant from a second cache 120. In some embodiments, in response to determining that the amount of symbols received (and/or in route to be received) exceeds the threshold amount of symbols, the client device 130 may additionally or alternatively cancel the request for consumption of the first media asset to stop transmission of further data from the at least one of the first cache 120 and the second cache 120 to the client device 130.

In some embodiments, at block 1035, the client device 130 decodes the received symbols from the caches 120 to generate a plurality of original symbols that were partitioned from the first media asset by the origin device 105. For example, decoding of one or more symbols included in at least one of a first variant and a second variant to recover the first media asset may include generating, with the client device 130 and from the one or more symbols included in at least one of the first coded variant and the second coded variant, a plurality of original symbols that were partitioned from the first media asset by the origin device 105.

In some embodiments, at block 1035, the client device 130 also outputs the first media asset for consumption by a user. For example, the client device 130 outputs the first media asset via one or more output devices such as the speaker 225 and/or the display 230.

As indicated in FIG. 10A, after performance of block 1035 and/or in conjunction with the performance of block 1035, the method 100 may proceed to block 1040 of FIG. 10B. However, blocks 1040 through 1055 of FIG. 10B are optional and may not be included in the method 1000 in some embodiments.

In some embodiments, at block 1040, the client device 130 determines whether it will contribute to the distributed and decentralized nature of the system 100 by acting as a cache 120/peer device 125 that stores media content for other devices to access. For example, the client device 130 may receive a user input to set a setting that indicates whether the client device 130 should function as a cache 120/peer device 125. As indicated in FIG. 10B, in response to determining that the client device 130 should not contribute as a cache 120/peer device 125, the method 1000 ends. However, in some embodiments, even when the method 1000 ends after block 1040, block 1035 may continue to be executed to, for example, continue outputting the first media asset for consumption by a user of the client device 130.

On the other hand, in response to determining that the client device 130 should contribute as a cache 120/peer device 125, the method 1000 proceeds to blocks 1045, 1050, and 1055 that are similar to respective blocks 705, 730, and 735 of the method 700 of FIG. 7 explained previously herein. For the sake of brevity, blocks 1045, 1050, and 1055 will not be explained in detail. However, as one example, at block 1050, the client device 130 may generate, using network coding, one or more recoded symbols from the plurality of original symbols (that were previously recovered through decoding at block 1035) to create a recoded variant. The recoded variant may be functionally-equivalent to a first coded variant received from a first cache 120 and a second coded variant received from a second cache 120 such that an amount of any data that exceeds the threshold amount of data and that is drawn from the recoded variant, the first coded variant, or the second coded variant allows for decoding of the amount of any data to recover the first media asset. As another example, the client device 130 could use direct recoding of received coded symbols from the first cache 120 and/or the second cache 120 to generate a functionally-equivalent recoded variant. In some embodiments, the client device 130 may store the recoded variant in its memory 210 for later transmission to at least one of another client device 130 and another cache 120.

In some embodiments, at block 1045, the client device 130 determines a storage budget of its memory 210 with respect to storing the first media asset. In some embodiments, at block 1050, the client device 130 then generates an amount of recoded symbols that will consume storage space less than or equal to the storage budget determined at block 1045.

Figure 11:
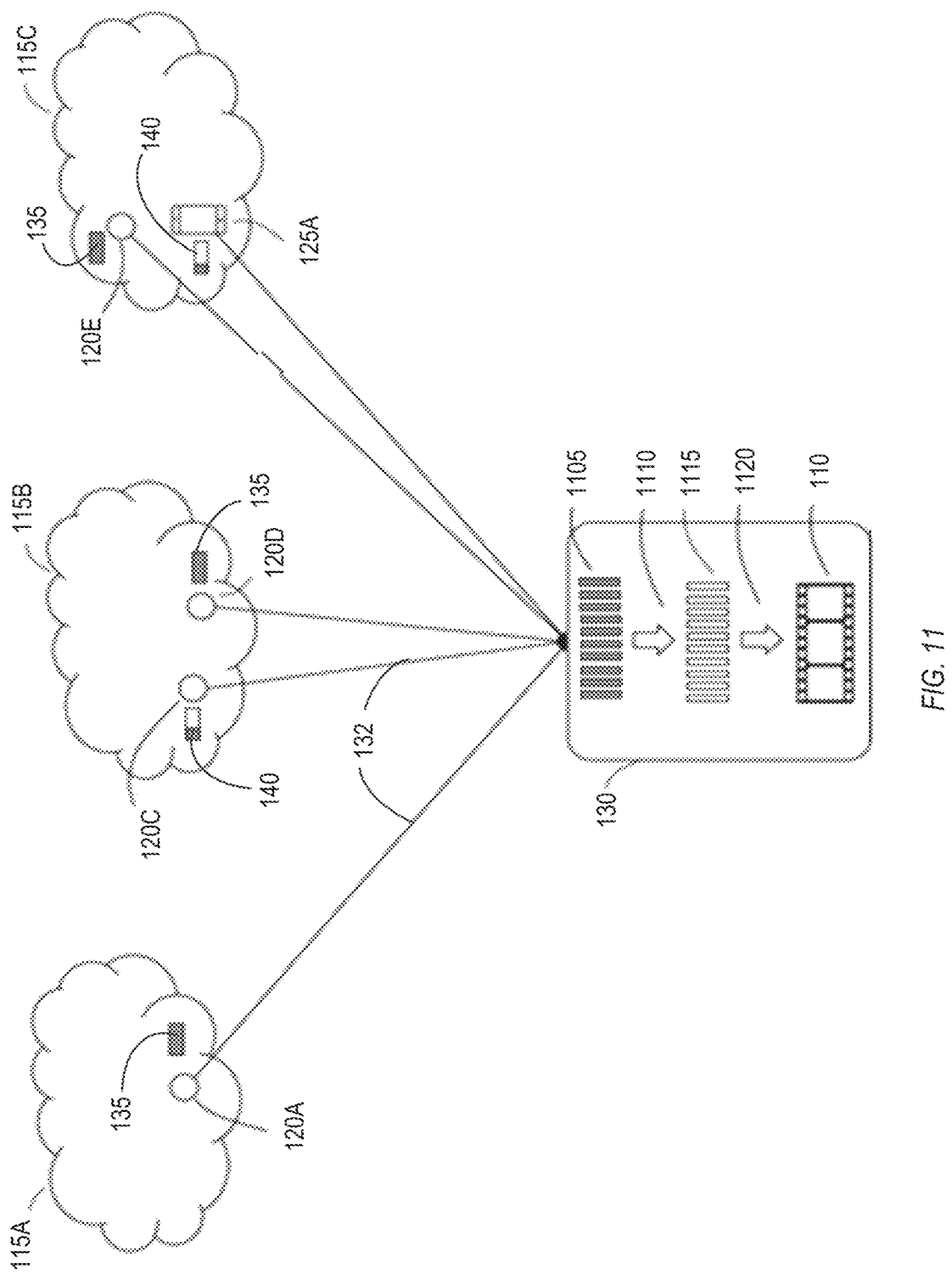
FIG. 11 illustrates an example instance of multi-source, multi-path downloading of media content on a client device of the system of FIG. 1 according to one example embodiment.

FIG. 11 illustrates an example instance of multi-source, multi-path downloading media content (e.g., the first media asset) on a client device 130 according to one example embodiment. In other words, FIG. 11 illustrates a specific example implementation of the method 1000 of FIGS. 10A-10B.

In the example shown in FIG. 11, the client device 130 is connected to five different information sources via different communication links 132 after performing discovery (at block 1005 of FIG. 10A). In the example shown, the five information sources include the following: (i) the cache 120A of cache cluster 115A that includes a full coded variant 135; (ii) the cache 120C of cache cluster 115B that includes a partial coded variant 140; (iii) the cache 120D of cache cluster 115B that includes a full coded variant 135; (iv) the cache 120E of cache cluster 115C that includes a full coded variant 135; and (v) the peer device 125A of cache cluster 115C that includes a partial coded variant 140.

In some embodiments and in accordance with the method 1000 of FIG. 10A, the client device 130 may request each of the five connected information sources to transmit the coded symbols included in their respective coded variant (at block 1015 of FIG. 10A). Upon the client device 130 receiving a threshold amount (e.g., K=10) of coded symbols 1105 from any one or more of the five information sources, the client device 130 may cease downloading coded symbols from the information sources (at block 1030 of FIG. 10A).

The client device 130 may then decode the received coded symbols 1105 (at step 1110 and block 1035 of FIG. 10A) to generate an amount (K=10) of original symbols 1115 into which the first media asset (e.g., the original media file 110) was portioned by the origin device 105. At step 1120, the client device 130 stiches the ten original symbols 1115 together (e.g., by re-ordering them in sequential order) to recover the first media asset (e.g., the original media file 110). The client device 130 may then output the first media asset on the client device 130 as described previously herein with respect to block 1035 of FIG. 10A.

Figure 12:
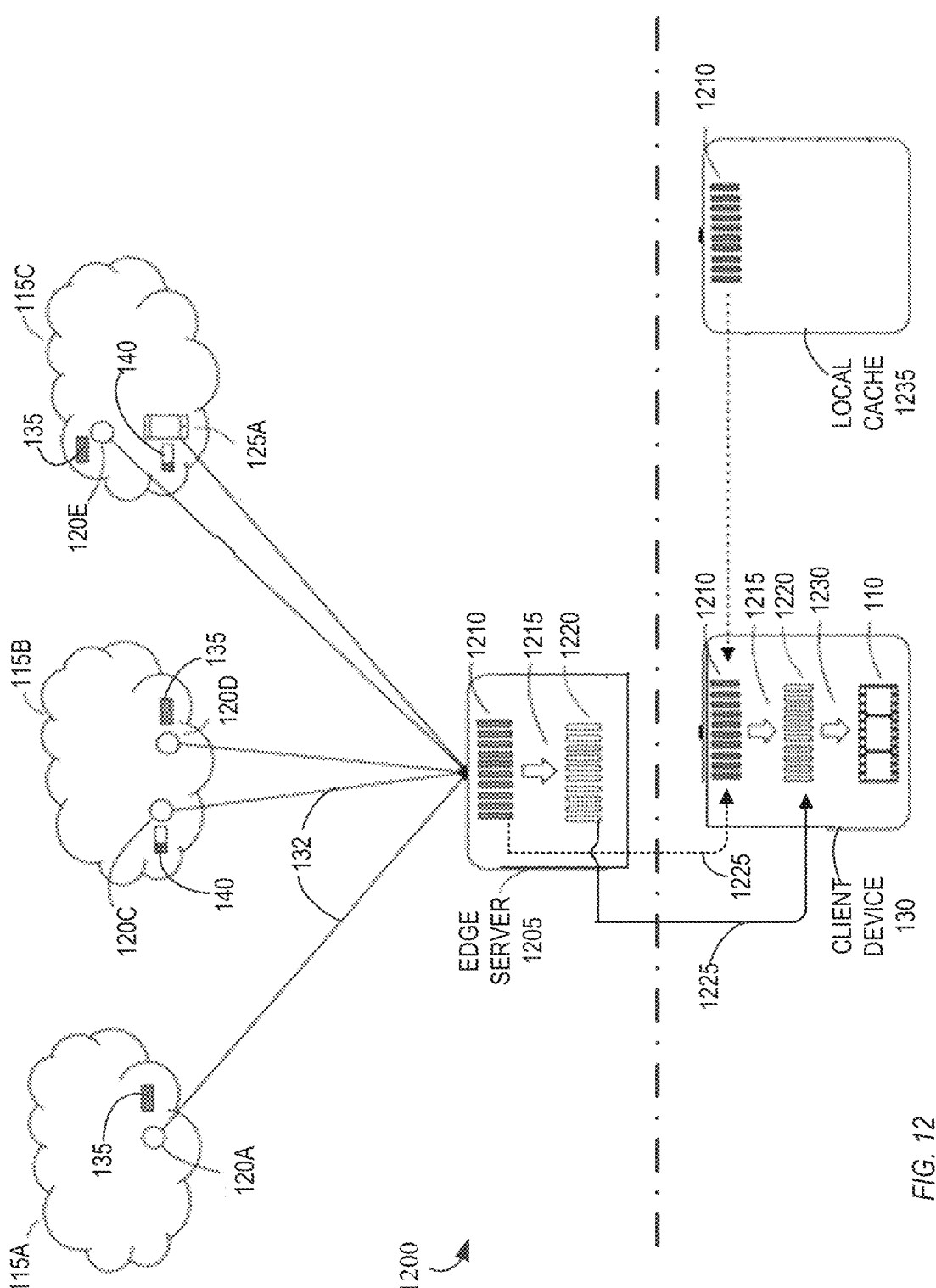
FIG. 12 illustrates another example media delivery system according to embodiments described herein.

FIG. 12 illustrates a system 1200 similar to the system 100 of FIGS. 1 and 11 but further including an edge server 1205 according to one example embodiment. As indicated by FIG. 12, the edge server 1205 may perform some similar functions as the client device 130 of the example shown in FIG. 11 but also may perform some similar functions as the caches 120. For example, the edge server 1205 may request and download coded symbols 1210 from a plurality of caches 120. The edge server 1205 may also decode the received coded symbols 1210 (at step 1215) to generate original symbols 1220 of a first media asset. The edge server 1205 also may transmit one or more coded symbols 1210 and/or one or more decoded original symbols 1220 to the client device 130.

Accordingly, in some embodiments, the edge server 1205 may provide a communication path to the caches 120 for the client device 130. For example, the dash-dot line in FIG. 12 indicates that the client device 130 is a local device configured to communicate with the edge server 1205 in order to access the caches 120. In some embodiments, the client device 130 can also communicate directly with one or more caches 120. In some embodiments, the communication links 132 between the caches 120 and the edge server 1205 are network communication links as described previously herein. In some embodiments, a communication link 1225 between the edge server 1205 and the client device 130 (e.g., to transmit symbols 1210 and/or 1220 to the client device 130) includes a different method of delivery of content than the communication link 132. For example, the communication link 1225 between the edge server 1205 and the client device may use point-to-point delivery, a lower latency network coding technique, traditional HyperText Transfer Protocol (HTTP), etc.

In other words, in some embodiments, the edge server 1205 (which also may be referred to as a server device) is configured to download a first coded variant 135, 140 from a first cache 120 via a first communication link 132 and a second coded variant 135, 140 from a second cache 120 via a second communication link 132. The edge server 1205 may then be configured to transmit a plurality of symbols 1210, 1220 based on at least one of the first coded variant and the second coded variant to the client device 130 via a third communication link 1225 that uses a different communication modality than either of the first communication link 132 and the second communication link 132. In some embodiments, the plurality of symbols 1210, 1220 includes (i) coded symbols 1210 of the at least one of the first coded variant and the second coded variant that are not decoded by the edge server 1205 before being transmitted to the client device 130 and (ii) original symbols 1220 that were partitioned from the first media asset by the origin device 105 and that have been generated by the edge server 1205 through decoding of the coded symbols 1210 of the at least one of the first coded variant and the second coded variant.

As shown in FIG. 12, the client device 130 may function similarly as the client device 130 shown in FIG. 11. For example, the client device 130 may receive the plurality of symbols 1210, 1220 and decode at least some of the coded symbols 1210 (at step 1215) to generate additional original symbols 1220. In some embodiments, the client device 130 may also receive a second plurality of symbols representing the first media asset directly from another cache 120. The client device 130 may decode at least some symbols of the plurality of symbols and the second plurality of symbols to recover the original symbols 1220 of the first media asset. The client device 130 may also stitch the original symbols 1220 together as explained previously herein (at step 1230)

and output the first media asset (e.g., the original media file 110) using an output device of the client device 130. In some embodiments, the another cache 120 from which the client device directly receives the second plurality of symbols is at least one of a local cache 1235 and a third cache 120 of a second server device (e.g., another edge server) or a remote cache cluster (e.g., cache clusters 115).

As indicated by the example shown in FIG. 12 and its corresponding explanation, the client device 130 may aggregate symbols (e.g., coded symbols, recoded/re-encoded symbols, and original symbols) received from different information sources over different communication links to recover the first media asset in an efficient manner (e.g., by ceasing downloading from all information sources in response to determining that an amount K=10 symbols have been received or are in route to be received by the client device 130).

In some embodiments, the edge server 1205 may include similar components as other server devices (i.e., cache clusters 115, CDNs, etc.) as explained previously herein. For example, the edge server 1205 may include similar components as the cache 120 shown in FIG. 3 (e.g., an electronic processor, a memory, and a network interface). As indicated in FIG. 12, the edge server 1205 includes some functionality of a client by, for example, discovering caches 120 and downloading symbols from the caches 120. However, the edge server 1205 also performs more traditional server functions with respect to the client device 130 by serving received coded symbols 1210 and/or original symbols 1220 to the client device 130.

It is to be understood that the embodiments are not limited in its application to the details of the configuration and arrangement of components set forth herein or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Various features and advantages are set forth in the following claims.

What is claimed is:

1. A method for receiving media content over a distributed system, the method comprising:

transmitting, to a plurality of caches, a request for consumption of a first media asset by a client device, wherein a coded variant of the first media asset is stored in each cache of the plurality of caches, wherein each coded variant includes one or more symbols that include at least one of (i) one or more original symbols of a plurality of original symbols representing the first media asset and (ii) one or more network-coded symbols of a plurality of network-coded symbols generated from the plurality of original symbols, downloading, with the client device, a first coded variant from a first cache of the plurality of caches via a first communication link;

downloading, with the client device, a second coded variant from a second cache of the plurality of caches via a second communication link different from the first communication link, wherein the second coded variant is received concurrently with the first coded variant;

decoding, with the client device, at least some of the one or more symbols included in at least one of the first coded variant and the second coded variant to recover the first media asset; and outputting, with the client device, the first media asset on an output device.

2. The method of claim 1, further comprising:

determining, with the client device, that an amount of symbols that have been received from at least one of the first cache and the second cache exceeds a threshold amount of symbols, wherein the threshold amount of symbols is based on an ability of the client device to decode a full representation of the first media asset; and in response to determining that the amount of symbols received exceeds the threshold amount of symbols, ceasing downloading, with the client device, of at least one of the first coded variant from the first cache and the second coded variant from the second cache.

3. The method of claim 2, wherein the threshold amount of symbols is based on a size of the first media asset.

4. The method of claim 1, further comprising:

determining, with the client device, that an amount of symbols transmitted from at least one of the first cache and the second cache to the client device exceeds a threshold amount of symbols, wherein the threshold amount of symbols is based on an ability of the client device decode a full representation of the first media asset once the amount of symbols are received by the client device; and in response to determining that the amount of symbols transmitted from the at least one of the first cache and the second cache to the client device exceeds the threshold amount of symbols, canceling, with the client device, the request for consumption of the first media asset to stop transmission of further data from the at least one of the first cache and the second cache to the client device.

5. The method of claim 1, wherein the second communication link is different from the first communication link due to the first communication link and the second communication link including at least one of:

different channels of a single communication modality, and different communication modalities.

6. The method of claim 1, wherein downloading of the first coded variant from the first cache and downloading of the second coded variant from the second cache occur without the first cache and the second cache receiving a portion of the first media asset after the request is received by the first cache and the second cache.

7. The method of claim 1, further comprising prior to transmitting the request for consumption of the first media asset:

discovering a plurality of available caches;

identifying the plurality of caches from the plurality of available caches based on determining that each cache of the plurality of caches includes a coded variant of the first media asset; and connecting to each cache of the plurality of caches.

8. The method of claim 1, wherein decoding of the at least some of the one or more symbols included in at least one of the first coded variant and the second coded variant to recover the first media asset includes generating, with the client device and from the one or more symbols included in at least one of the first coded variant and the second coded variant, a plurality of original symbols that were partitioned from the first media asset by an origin device.

9. The method of claim 8, further comprising:

generating, with the client device and using network coding, one or more recoded symbols from the plurality of original symbols to create a recoded variant, wherein the recoded variant is functionally-equivalent to the first coded variant and the second coded variant such that an amount of any data that exceeds a threshold amount of data and that is drawn from any one or more of the recoded variant, the first coded variant, and the second coded variant allows for decoding of the amount of any data to recover the first media asset; and storing, with the client device, the recoded variant for later transmission to at least one of another client device and another cache.

10. The method of claim 9, wherein generating the one or more recoded symbols from the plurality of original symbols to create the recoded variant comprises:

determining, with the client device, a storage budget of the client device; and generating an amount of recoded symbols that will consume storage space less than or equal to the storage budget.

11. The method of claim 1, wherein transmitting the request for consumption of the first media asset comprises transmitting, with the client device, the request to the first cache and to the second cache.

12. The method of claim 1, wherein transmitting the request for consumption of the first media asset comprises:

transmitting, with the client device, the request to a server device; and in response to receiving the request, transmitting with the server device the request to the plurality of caches including the first cache and the second cache.

13. The method of claim 1, further comprising:

downloading, with a server device communicably coupled to the client device, the first coded variant from the first cache via the first communication link;

downloading, with the server device, the second coded variant from the second cache via the second communication link; and transmitting, with the server device, a plurality of symbols based on at least one of the first coded variant and the second coded variant to the client device via a third communication link that uses a different communication modality than either of the first communication link and the second communication link.

14. The method of claim 13, wherein the plurality of symbols includes at least one of:

coded symbols of the at least one of the first coded variant and the second coded variant that are not decoded by the server device before being transmitted to the client device; and original symbols that were partitioned from the first media asset by an origin device and that have been generated by the server device through decoding of the coded symbols of the at least one of the first coded variant and the second coded variant.

15. The method of claim 13, further comprising:

receiving, with the client device, the plurality of symbols from the server device;

receiving, with the client device, a second plurality of symbols representing the first media asset from another cache; and decoding, with the client device, at least some symbols of the plurality of symbols and the second plurality of symbols to recover the first media asset.

16. The method of claim 15, wherein the another cache is at least one of a local cache and a third cache of a second server device or a remote cache cluster.

17. The method of claim 1, wherein each coded variant includes at least one of:

a full-size coded variant that is configured to independently admit recovery of the first media asset through network decoding; and a partial coded variant that is not configured to independently admit recovery of the first media asset through network decoding.

18. The method of claim 1, wherein each coded variant is functionally-equivalent such that an amount of any data that exceeds a threshold amount of data and that is drawn from any one or more coded variants allows for decoding of the amount of any data to recover the first media asset.

19. The method of claim 1, wherein the first cache is part of a first access network and wherein the second cache is part of a second access network different from the first access network; and wherein downloading the first coded variant from the first cache includes communicating over the first access network, and wherein downloading the second coded variant from the second cache includes communicating over the second access network.

20. The method of claim 19, wherein the first access network includes a $3^{rd}$ Generation Partnership Project (3GPP) network, a fifth generation (5G) mobile network, a sixth generation (6G) mobile network, and another mobile network, and wherein the second access network includes a $3^{rd}$ Generation Partnership Project (3GPP) network, a fifth generation (5G) mobile network, a sixth generation (6G) mobile network, and another mobile network.

21. The method of claim 19, wherein the client device is a mobile device, and further comprising:

connecting, with the client device, to the first access network to communicate over the first access network;

downloading, with the client device, the first coded variant from the first cache;

disconnecting, with the client device, from the first access network;

connecting, with the client device, to the second access network to communicate over the second access network; and downloading, with the client device, the second coded variant from the second cache.

22. The method of claim 21, wherein disconnecting from the first access network and connecting to the second access network occurs in response to the client device moving from a first coverage area of the first access network to a second coverage area of the second access network.

23. A non-transitory computer-readable storage medium storing one or more programs configured to be executed by one or more processors of an electronic device including a network interface and an output device, the one or more programs including instructions for performing the method of claim 1.

24. An electronic device, comprising:

a network interface;

an output device;

one or more electronic processors; and a memory storing one or more programs configured to be executed by the one or more electronic processors, the one or more programs including instructions for performing the method of claim 1.

* * * * *